: US 9,124,155 B2
(45) Date of Patent: Sep. 1, 2015

(12) United States Patent
Yamasaki et al.

(54) DRIVE APPARATUS INCLUDING MOTOR

(75) Inventors: Masashi Yamasaki, Obu (JP); Hideki Kabune, Nagoya (JP); Atsushi Furumoto, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 93 days.

(21) Appl. No.: 13/380,309

(22) PCT Filed: Jun. 23, 2010

(86) PCT No.: PCT/JP2010/004157
§ 371 (c)(1),
(2), (4) Date: Dec. 22, 2011

(87) PCT Pub. No.: WO2010/150528
PCT Pub. Date: Dec. 29, 2010

(65) Prior Publication Data
US 2012/0098365 A1 Apr. 26, 2012

(30) Foreign Application Priority Data

Jun. 24, 2009 (JP) ................. 2009-149650
Jan. 26, 2010 (JP) ................. 2010-014393
May 21, 2010 (JP) ................. 2010-117685

(51) Int. Cl.
*H02K 11/00* (2006.01)
*H02K 5/22* (2006.01)
(Continued)

(52) U.S. Cl.
CPC ............... *H02K 9/22* (2013.01); *B62D 5/0406* (2013.01); *H02K 3/50* (2013.01); *H02K 5/225* (2013.01); *H02K 11/0073* (2013.01)

(58) Field of Classification Search
CPC ........ H02K 9/22; H02K 5/22; H02K 11/0073
USPC ............................................ 310/64, 68 B, 71
See application file for complete search history.

(56) References Cited

U.S. PATENT DOCUMENTS 4,988,905 A * 1/1991 Tolmie, Jr. ............... 310/68 B
5,406,154 A   4/1995 Kawaguchi et al.
(Continued)

FOREIGN PATENT DOCUMENTS

JP         3-89837         4/1991
JP      05095606 A   *   4/1993
(Continued)

OTHER PUBLICATIONS

Machine Translation, Kawaguchi et al., JP 05095606 A, Apr. 16, 1993.*

(Continued)

*Primary Examiner* — Thomas Truong
(74) *Attorney, Agent, or Firm* — Nixon & Vanderhye PC

(57) ABSTRACT

A heat sink of a drive apparatus includes a heat receiving surface located in a rising direction from an end surface wall of a motor case formed in an axial direction of the motor case. A power module includes a mold part and is arranged along the heat receiving surface of the heat sink. Motor leads are taken out from the motor case and electrically connected to the power module and winding wires. The drive apparatus has the motor case, a control circuit substrate, the heat sink, the power module and a power circuit substrate arranged in this order in the axial direction. The motor leads are connected to the power module at an opposite side of the motor case relative to the mold part in the axial direction.

13 Claims, 25 Drawing Sheets

(51) Int. Cl.
*H02K 9/22* (2006.01)
*B62D 5/04* (2006.01)
*H02K 3/50* (2006.01)

(56) References Cited

U.S. PATENT DOCUMENTS

| | | | |
|---|---|---|---|
| 5,500,563 | A | 3/1996 | Kawaguchi et al. |
| 5,552,988 | A | 9/1996 | Kawaguchi et al. |
| 5,932,942 | A | 8/1999 | Patyk et al. |
| 5,952,751 | A | 9/1999 | Yamakoshi et al. |
| 6,081,056 | A | 6/2000 | Takagi et al. |
| 6,577,030 | B2 * | 6/2003 | Tominaga et al. .......... 310/68 B |
| 6,593,674 | B2 | 7/2003 | Sanchez et al. |
| 6,704,201 | B2 * | 3/2004 | Kasuga ......................... 361/704 |
| 7,207,187 | B2 * | 4/2007 | Funahashi et al. ........... 62/228.4 |
| 2002/0060105 | A1 | 5/2002 | Tominaga et al. |
| 2003/0047304 | A1 | 3/2003 | Kasuga |
| 2004/0090130 | A1 | 5/2004 | Kaneko et al. |
| 2005/0167183 | A1 | 8/2005 | Tominaga et al. |
| 2006/0208582 | A1 | 9/2006 | Marioni |
| 2006/0261689 | A1 | 11/2006 | Natsuhara et al. |
| 2007/0070603 | A1 | 3/2007 | Park et al. |
| 2008/0106160 | A1 | 5/2008 | Yoshinari et al. |
| 2008/0127463 | A1 | 6/2008 | Zhao et al. |
| 2010/0225307 | A1 | 9/2010 | Takahashi |
| 2011/0286185 | A1 | 11/2011 | Abe et al. |
| 2012/0104886 | A1 | 5/2012 | Yamasaki et al. |

FOREIGN PATENT DOCUMENTS

| | | |
|---|---|---|
| JP | 9-123929 | 5/1997 |
| JP | 10-234158 | 9/1998 |
| JP | 10-322973 | 12/1998 |
| JP | 2000-174203 | 6/2000 |
| JP | 2002-120939 | 4/2002 |
| JP | 2002-345211 | 11/2002 |
| JP | 2005-73373 | 3/2005 |
| JP | 2005-073392 | 3/2005 |
| JP | 2005-176451 | 6/2005 |
| JP | 2007-288929 | 11/2007 |
| JP | 2008-29093 | 2/2008 |
| JP | 2008-141881 | 6/2008 |
| JP | 2008-270293 | 11/2008 |
| JP | 2009-113526 | 5/2009 |

OTHER PUBLICATIONS

U.S. Appl. No. 13/380,321, M. Yamasaki et al., filed Dec. 22, 2011.
U.S. Appl. No. 13/379,096, M. Yamasaki et al., filed Dec. 19, 2011.
U.S. Appl. No. 13/379,118, M. Yamasaki et al., filed Dec. 19, 2011.
U.S. Appl. No. 13/336,492, M. Yamasaki et al., filed Dec. 23, 2011.
Office Action (8 pages) dated Jun. 4, 2013, issued in copending Chinese Application No. 201080028216.9 and English translation (14 pages).
Office Action (14 pgs.) dated Aug. 14, 2013 issued in co-pending U.S. Appl. No. 13/336,492.
International Search Report for PCT/JP2010/004157, mailed Sep. 28, 2010.
Written Opinion of the International Searching Authority for PCT/JP2010/004157, mailed Sep. 28, 2010.
Office Action (2 pages) dated Jul. 19, 2013, issued in copending Japanese Application No. 2010-117683 and English translation (3 pages).
Office Action (3 pages) dated Jul. 19, 2013, issued in copending Japanese Application No. 2010-117684 and English translation (4 pages).
Office Action (2 pages) dated Jul. 19, 2013, issued in copending Japanese Application No. 2010-117685 and English translation (3 pages).
Office Action (2 pages) dated Jul. 19, 2013, issued in copending Japanese Application No. 2010-117686 and English translation (3 pages).
Office Action (7 pages) dated Dec. 24, 2013, issued in corresponding Chinese Application No. 201210013678.4 and English translation (13 pages).
Office Action (2 pages) dated Nov. 14, 2013, issued in corresponding Japanese Application No. 2010-117684 and English translation (3 pages).
Office Action (12 pgs.) dated May 13, 2014 issued in co-pending U.S. Appl. No. 13/379,096.
Office Action (17 pages) dated Apr. 16, 2014, issued in corresponding Chinese Application No. 201080028286.4 and English translation (29 pages).
Office Action (6 pages) dated Jun. 4, 2014, issued in corresponding Chinese Application No. 201080028288.3 and English translation (11 pages).
Office Action (2 pages) dated Sep. 30, 2014 in corresponding Japanese Application No. 2013-254922 and English translation (2 pages).
Office Action (5 pages) dated Jul. 25, 2014, issued in corresponding Chinese Application No. 201210013678.4 and English translation (11 pages).
Office Action (13 pages) dated Sep. 10, 2014 issued in co-pending U.S. Appl. No. 13/379,118 to Yamasaki, filed Dec. 19, 2011.
Office Action (7 pages) dated May 21, 2014, issued in corresponding Chinese Application No. 201080028284.5 and English translation (9 pages).
Office Action (11 pages) dated Sep. 25, 2014 issued in co-pending U.S. Appl. No. 13/379,096 to Yamasaki, filed Dec. 19, 2011.
Office Action (6 pages) dated Jan. 12, 2015 issued in corresponding Chinese Application No. 201080028284.5 and English translation (9 pages).
Office Action (14 pages) dated Dec. 26, 2014 issued in co-pending U.S. Appl. No. 13/379,118 to Yamasaki, filed Dec. 19, 2011.
Office Action (4 pages) dated Jan. 13, 2015 issued in corresponding Chinese Application No. 201080028288.3 and English translation (9 pages).

* cited by examiner

DRIVE APPARATUS INCLUDING MOTOR

CROSS REFERENCE TO RELATED APPLICATIONS

This application is the U.S. national phase of International Application No. PCT/JP2010/004157 filed on Jun. 23, 2010, which designated the U.S. and claims priority to Japanese Patent Applications No. 2009-149650 filed on Jun. 24, 2009, No. 2010-14393 filed on Jan. 26, 2010 and No. 2010-117685filed on May 21, 2010, the disclosures of each of which are incorporated herein by reference.

TECHNICAL FIELD

The present invention relates to a drive apparatus, which has an electric motor and an electronic control unit for controlling driving of the electric motor.

BACKGROUND ART

In recent years, an electric power steering system (EPS system) that generates torque electrically is used as a mechanism for assisting a vehicle steering operation. Different from a hydraulic power steering system, the EPS system assists the vehicle steering operation only when a steering operation is performed by a driver. Therefore, the EPS system provides many advantages such as low-fuel consumption.

A motor provided in the EPS system generates torque. For example, a brushless motor, which is driven to rotate by supplying a three-phase AC current, is used in the EPS system. In a case where the brushless motor is used in the EPS system, a DC output supplying a predetermined voltage (for example, 12V) needs to be converted to a phase-shifted AC output in order to supply phase-shifted current to multi-phase (for example, three-phase) coils of the brushless motor. Thus, an electronic control unit is needed to switch over current supply to motor coils. The electronic control unit includes a semiconductor module which performs switching operation.

In a conventional drive apparatus, the electronic control unit is located near an electric motor (for example, disclosed in following patent documents No. 1 to No. 4).

For example, in the patent document No. 1, an electric motor, a heat sink, a power circuit substrate, semiconductor switching elements and a control circuit substrate are stacked in this order. The semiconductor switching elements are mounted on the power circuit substrate in such a manner that a wide surface of each semiconductor switching element is parallel to the power circuit substrate. Therefore, the semiconductor switching element covers a large area on the power circuit substrate, making it difficult to reduce the size of the drive apparatus.

PRIOR ART DOCUMENT

Patent Document

Patent document No. 1: JP-A-2002-120739
Patent document No. 2: JP-A-H10-234158
Patent document No. 3: JP-A-H10-322973
Patent document No. 4: JP-A-2004-159454

SUMMARY OF INVENTION

It is therefore an object of the present invention to provide a small-sized drive apparatus having a built-in electronic control unit.

A drive apparatus according to the present invention includes a motor, a heat sink, a power module, a control wiring part and a power wiring part. The motor includes a motor case formed in a cylindrical shape to define an outer periphery, a stator located radially inside the motor case and winding wires wound to provide a plurality of phases, a rotor located radially inside the stator and rotatable relative to the stator, and a shaft rotatable together with the rotor. The heat sink includes a heat receiving surface located in a rising direction from an end surface wall of the motor case formed in an axial direction of the motor case. The power module includes switching elements to switch over current supply to the winding wires, a mold part to mold the switching elements, terminals protruded from the mold part, and is arranged along the heat receiving surface of the heat sink. The control wiring part includes a control circuit that controls the driving of the motor, and is electrically connected to the power module. The power wiring part supplies a drive current to the winding wires, and is electrically connected to the power module. The power module and the winding wires are electrically connected to each other by motor leads taken out from the motor case. The motor case, the control wiring part, the heat sink and the power module, and the power wiring part are arranged in this order in the axial direction of the motor case. The motor leads are connected to the power module at a position, which is opposite to the motor case relative to the mold part of the power module in the axial direction of the motor case.

DESCRIPTION OF EMBODIMENTS

Figure 1:
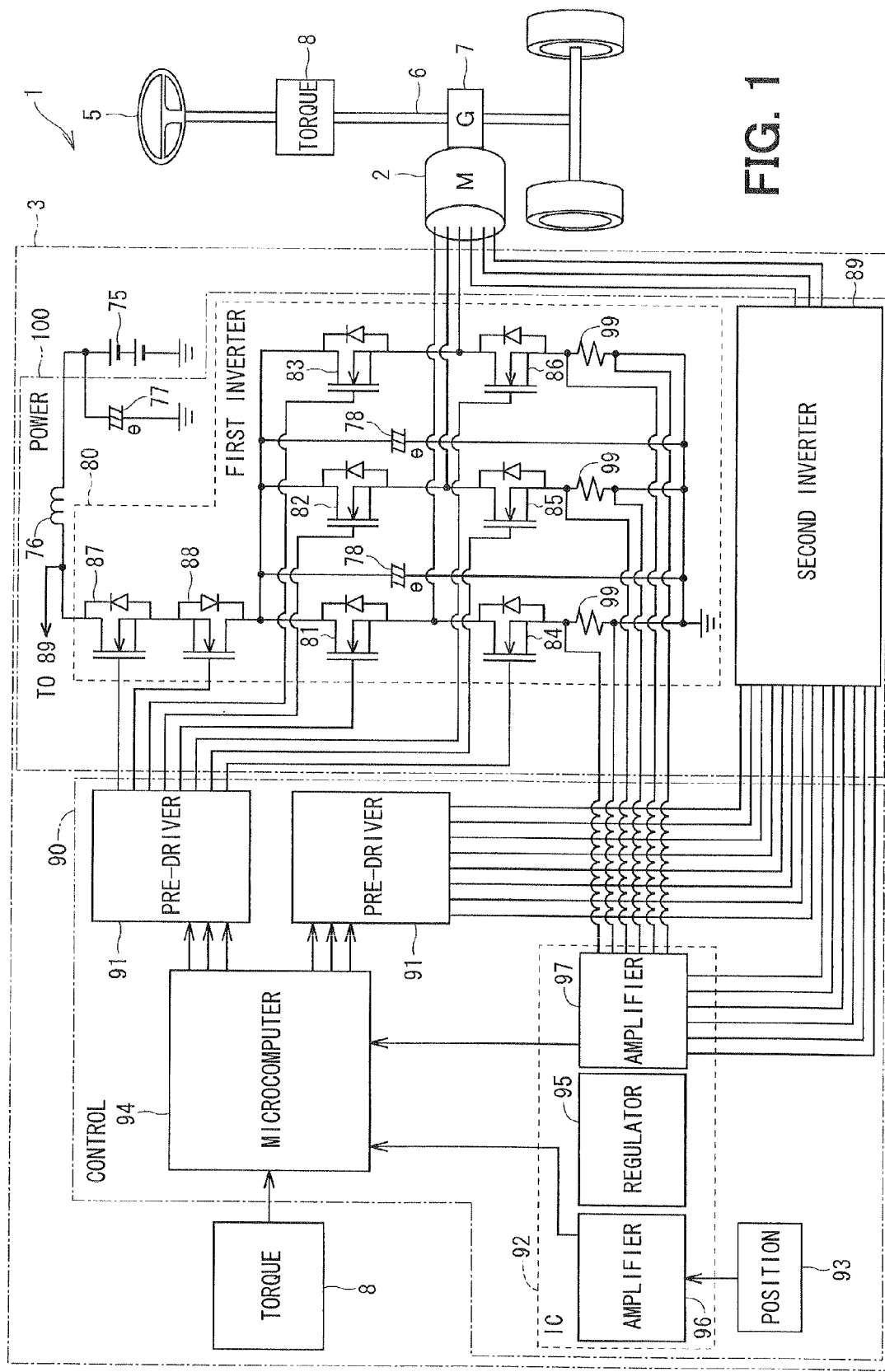
FIG. 1 is a block diagram showing a power steering system using a drive apparatus according to a first embodiment of the present invention.

Embodiments of a drive apparatus having a built-in electronic control unit according to the present invention will be described with reference to the accompanying drawings. In each of the following embodiments, the same or equivalent reference number is added to the same or equivalent parts in the drawings.

(First Embodiment)

A drive apparatus according to a first embodiment of the present invention is shown in FIGS. 1 to 19.

The drive apparatus 1 is applied to an electric power steering system (EPS). The drive apparatus 1 is a motor apparatus with a built-in electronic control unit. The motor apparatus has a motor 2 and an electronic control unit 3. The electronic control unit 3 has a control circuit substrate 40 as a control wiring part, a heat sink 50, a power module 60, a power circuit substrate 70 as a power wiring part and the like (see FIGS. 5 and 6)

As shown in FIG. 1, the drive apparatus 1 is used to assist vehicle steering operation by a steering wheel 5 of a vehicle by driving a column shaft 6 to generate rotational torque through a gear 7 attached to the column shaft 6, which is a rotational shaft of the steering wheel 5. Specifically, when the steering wheel 5 is operated by a driver, the drive apparatus 1 assists the steering operation of the driver on the steering wheel 5 by detecting steering torque generated in the column shaft 6 and acquiring vehicle speed information from CAN (controller area network), which is not shown. The steering torque is detected by a torque sensor 8. It is also possible to use this mechanism for not only assisting steering operation but also other operations depending on different control processing. The other operations have automatic control of the steering wheel 5 such as lane keeping on an expressway, guiding to a parking space in a parking lot and the like.

The motor 2 is a brushless motor, which rotates the gear 7 in forward and reverse directions. The electronic control unit 3 controls current supply to the motor 2 and drive operation of the motor 2. The electronic control unit 3 has a power circuit 100, which supplies drive currents to drive the motor 2, and a control circuit 90, which controls driving of the motor 2, that is, supply of the drive currents from the power circuit 100 to the motor 2.

The power circuit 100 has a choke mil 76 provided between a DC power source 75 and a power supply line, a capacitor 77 and two sets of (first and second) inverter circuits 80 and 89. The inverter circuits 80 and 89 have the same configuration, and hence only the first inverter circuit 80 is described below.

The first inverter circuit 80 has MOSs (metal-oxide-semiconductor field-effect transistors referred to as MOSs) 81 to 86. Each of the MOSs 81 to 86 is turned on (conduction) or off (non-conduction) between a source-drain path depending on a gate potential thereof. The MOSs 81 to 86 are switching elements.

The MOS 81 has a drain connected to the power supply line side and a source connected to a drain of the MOS 84. The MOS 84 has a source connected to the ground. A junction between the MOS 81 and the MOS 84 is connected to a U-phase coil of the motor 2.

The MOS 82 has a drain connected to the power supply line side and a source connected to a drain of the MOS 85. The MOS 85 has a source connected to the ground. A junction between the MOS 82 and the MOS 85 is connected to a V-phase coil of the motor 2.

The MOS 83 has a drain connected to the power supply line side and a source connected to a drain of the MOS 86. The MOS 86 has a source connected to the ground. A junction between the MOS 83 and the MOS 86 is connected to a W-phase coil of the motor 2.

The inverter circuit 80 has power supply relays 87 and 88. The power supply relays 87 and 88 are formed of MOSs similar to the MOSs 81 to 86. The power supply relays 87 and 88 are provided in series between the MOSs 81 to 83 and the power source 75 to interrupt current flowing at the time of occurrence of abnormality. Further, the power supply relay 87 is provided to interrupt currents from flowing to the motor 2 side when a disconnection or short-circuit happens. The power supply relay 88 is provided to protect circuit components by interrupting reverse currents from flowing to circuit components when an electronic component such as the capacitor 77 is connected in reverse by mistake.

The shunt resistors 99 are electrically connected between the MOSs 84 to 86 and the ground. Currents flowing in the U-phase coil, the V-phase coil and the W-phase coil of the motor 2 are detected by detecting voltages developed by or currents flowing in the shunt resistors 99.

The choke coil 76 and the capacitor 77 are electrically connected between the power source 75 and the power supply relay 87. The choke coil 76 and the capacitor 77 form a filter circuit to reduce noise applied from other devices, which share the power source 75, and reduce noise applied from the drive apparatus 1 to other devices, which share the power source 75.

Capacitors 78 are electrically connected between power source sides of the MOSs 81 to 83 provided at the power supply line side and ground sides of the MOSs 84 to 86 provided at the ground side. The capacitors 78 assist electric power supply to the MOSs 81 to 86 and suppress noise components such as surge voltages by storing electric charge.

The control circuit 90 has a pre-driver circuit 92, a customized IC 92, a position sensor 93 as a rotation detection part and a microcomputer 94. The customized IC 92 has, as functional blocks, a regulator circuit 95, a position sensor signal amplifying circuit 96 and a detection voltage amplifying circuit 97.

The regulator circuit 95 is a stabilizing circuit for stabilizing power supply. The regulator circuit 95 stabilizes electric power supplied to each part. For example, the microcomputer 94 is operated with a predetermined voltage (for example, 5V), which is stabilized by the regulator circuit 95.

A signal from the position sensor 93 is applied to the position sensor signal amplifying circuit 96. The position sensor 93 detects a rotational position of the motor 2 and the rotational position signal is applied to the position sensor signal amplifying circuit 96. The position sensor signal amplifying circuit 96 amplifies and outputs the rotation position signal to the microcomputer 94.

The detection voltage amplifying circuit 97 detects voltages applied to the shunt resistors 99 and amplifies and outputs the terminal voltages of the shunt resistors 99 to the microcomputer 94.

The rotation position signal of the motor 2 and the terminal voltages of the shunt resistors 99 are inputted to the microcomputer 94. A steering torque signal is also inputted to the microcomputer 94 from the torque sensor 8 attached to the column shaft 6. The vehicle speed information is inputted to the microcomputer 94 through CAN. The microcomputer 94 controls, based on the steering torque signal and the vehicle speed information, the inverter circuit 80 through the pre-driver circuit 91 in correspondence to the rotation position signal so that the steering operation by the steering wheel 5 is power-assisted in correspondence to the vehicle travel speed. Specifically, the microcomputer 94 controls the inverter circuit 80 by switching over on/off states of the MOSs 81 to 86 through the pre-driver circuit 91. Since the gates of six MOSs 81 to 86 are connected to six output terminals of the pre-driver circuit 91, the on/off states of the MOSs 81 to 86 are switched over by changing the gate voltages by the pre-driver circuit 91.

The microcomputer 94 controls the inverter circuit 80 in accordance with the terminal voltages of the shunt resistors 99, which are inputted from the detection voltage amplifying circuit 97, so that the current supplied to the motor 2 is approximated in a sinusoidal waveform. The control circuit 90 also controls the inverter circuit 89 in the similar manner as controlling the inverter circuit 80.

Figure 2:
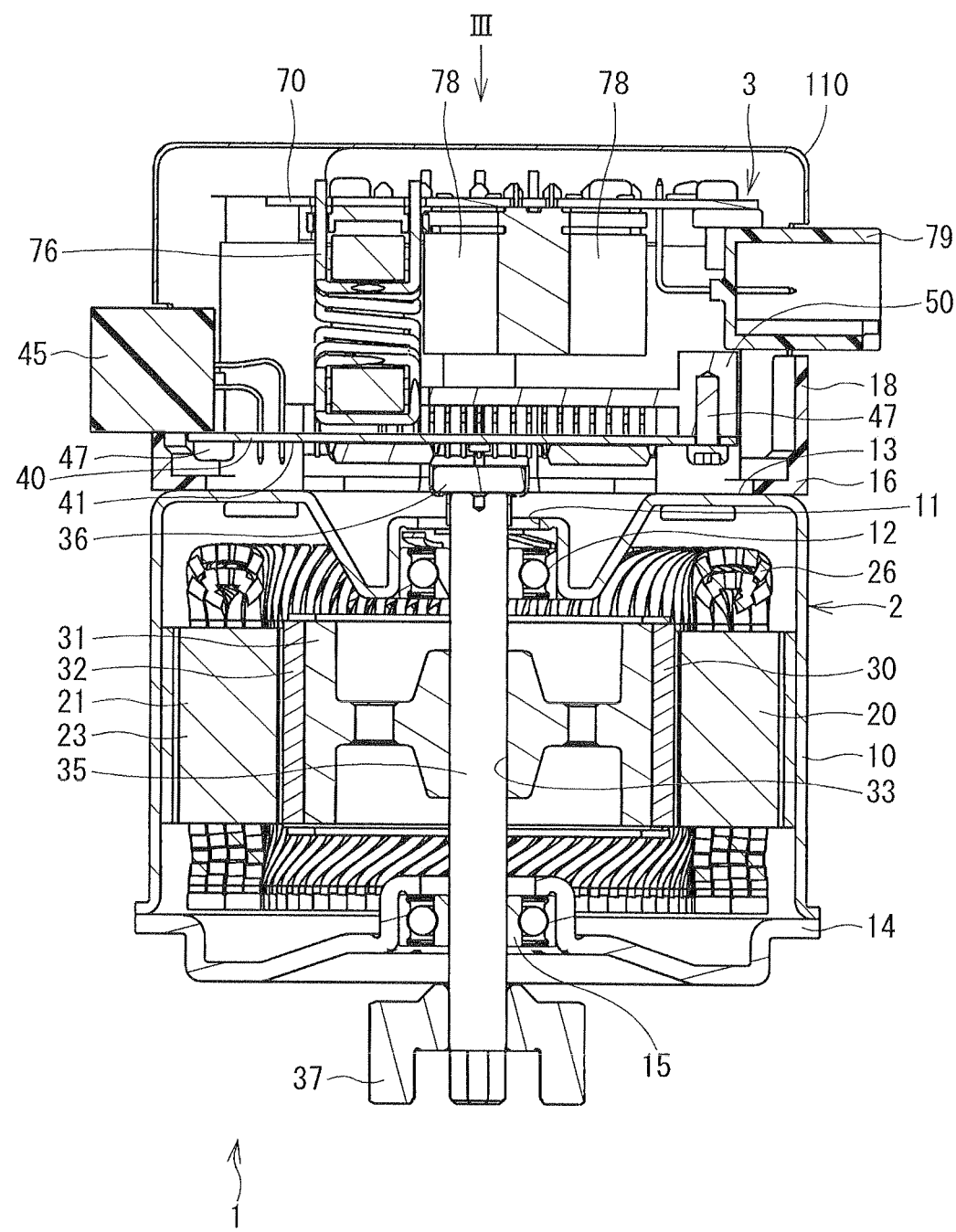
FIG. 2 is a cross-sectional view of the drive apparatus according to the first embodiment of the present invention.
Figure 3:
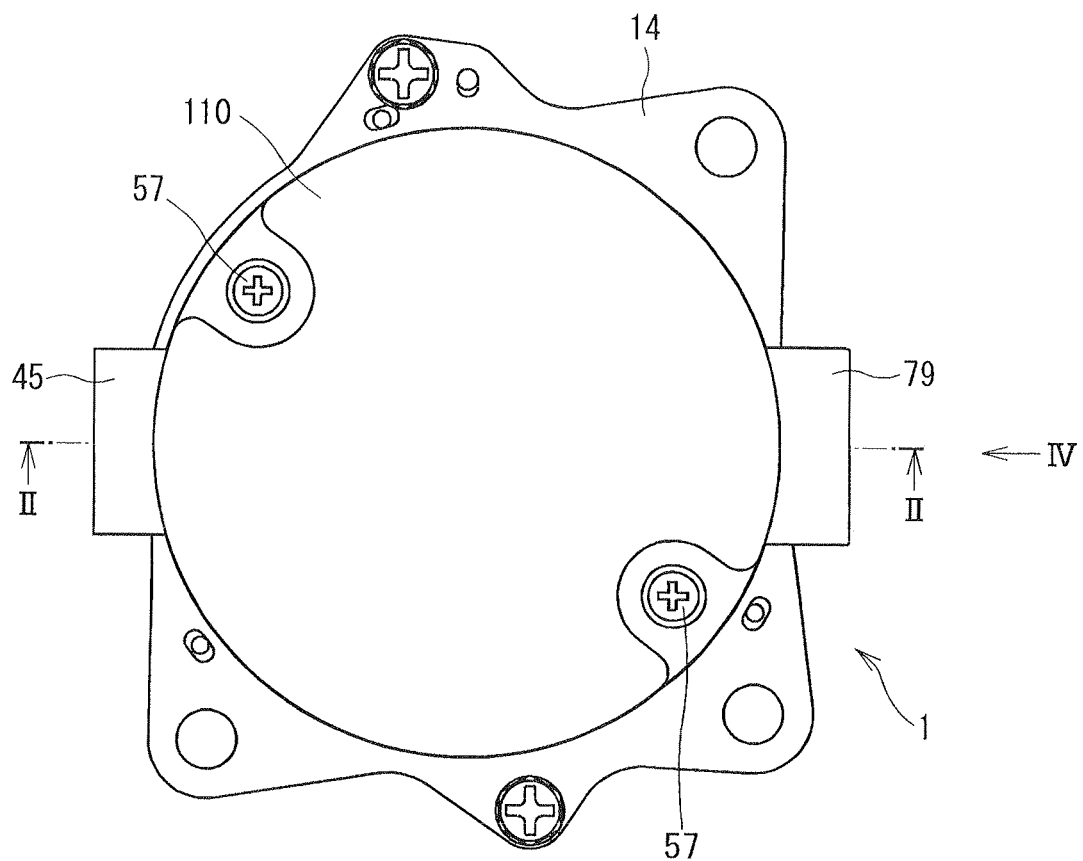
FIG. 3 is a plan view of the drive apparatus according to the first embodiment of the present invention.
Figure 4:
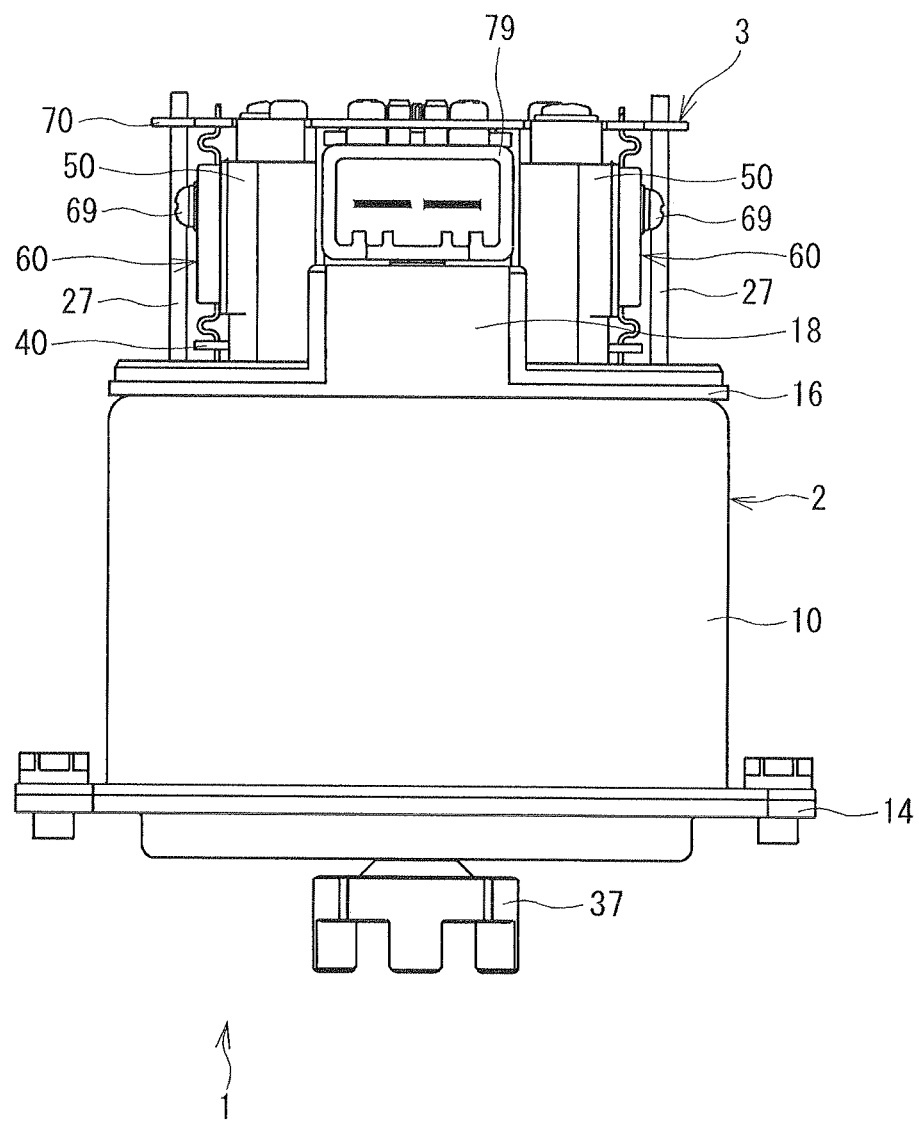
FIG. 4 is a side view of the drive apparatus viewed in a direction IV in FIG. 3 under a condition that a cover is removed.

As shown in FIG. 2, the electronic control unit 3 is located at one end in an axial direction of the motor 2. The drive apparatus 1 thus has a stack structure in which the motor 2 and the electronic control unit 3 are stacked in the axial direction of the motor 2.

The motor 2 has a motor case 10, a stator 20, a rotor 30, a shaft 35 and the like.

The motor case 10 is formed in a cylindrical shape and made of iron or the like. An end frame 14 made of aluminum is tightly fixed to the motor case 10 at an axial end part, which is opposite to the electronic control unit 3, by screws or the like. An opening 11 is provided in the motor case 10 at the axial center of an end part, which is on the electronic control unit 3 side. The shaft 35 passes through the opening 11.

A resin guide 16 is provided at the end part of the motor case 10, which is at the electronic control unit 3 side. The resin guide 16 is formed in a substantially annular shape having its central part, which is open.

The stator 20 is located inside the motor case 10 in a radial direction. The stator 20 has twenty protruded salient poles 21, which are located inside the motor case 10 in the radial direction. The salient poles 21 are uniformly distributed on a circumference of the motor case 10. The salient pole 21 has a stacked iron core 23, which is stack of thin plates of magnetic material, and an insulator, which is fitted to the outside of the stacked iron core 23 in a radial direction. The insulators are not shown in the drawings. Winding wires 26 are wound on the insulators. The winding wires 26 form three-phase winding wires, which have a U-phase coil, a V-phase coil and a W-phase coil.

The rotor 30 is located radially inside the stator 20 so that it is rotatable relative to the stator 20. The rotor 30 is formed of magnetic material such as iron in a cylindrical shape. The rotor 30 has a rotor core 31 and permanent magnets 32 located radially outside the rotor core 31. The permanent magnets 32 are arranged so that N-pole and S-pole alternate in a circumferential direction.

The shaft 35 is fixed in a shaft hole 33 formed in the axial center of the rotor core 31. The shaft 35 is supported rotatably by a bearing 12 provided in the motor case 10 and a bearing 15 provided in the end frame 14. Thus the shaft 35 is rotatable with the rotor 30 relative to the stator 20.

The shaft 35 has a magnet 36 at its axial end part, which is at the electronic control unit 3 side. Since the electronic control unit 3 side of the shaft 35 is inserted through the opening 11 of the motor case 10, the magnet 36 fixed to the axial end part of the shaft 35 at the electronic control unit 3 side is exposed towards the electronic control unit 3 side. The shaft 35 does not pass through the control circuit substrate 40. The magnet 36 is located near an end surface 41 of the control circuit substrate 40, which is at the motor 2 side, facing the end surface 41.

The shaft 35 has an output end 37 at an end position, which is opposite to the electronic control unit 3 relative to the motor case 10. A gear box, which is not shown, is provided on a side of the shaft 35, which is the opposite side of the electronic control unit 3. The gear 7 (see FIG. 1) is provided in the gear box. The gear 7 is coupled to the output end 37, and is driven to rotate by driving force outputted from the shaft 35.

Figure 5:
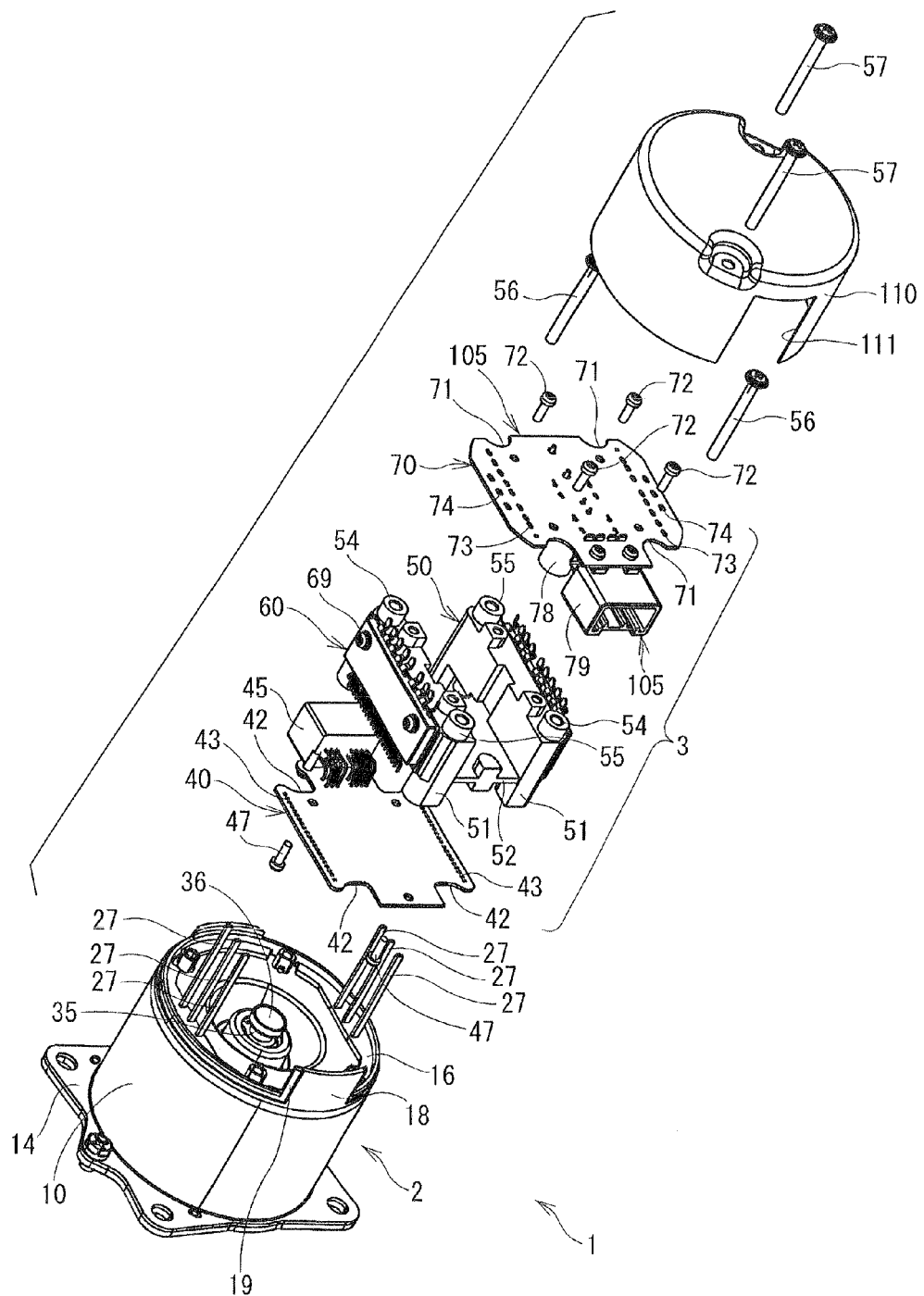
FIG. 5 is an exploded perspective view of the drive apparatus according to the first embodiment of the present invention.
Figure 6:
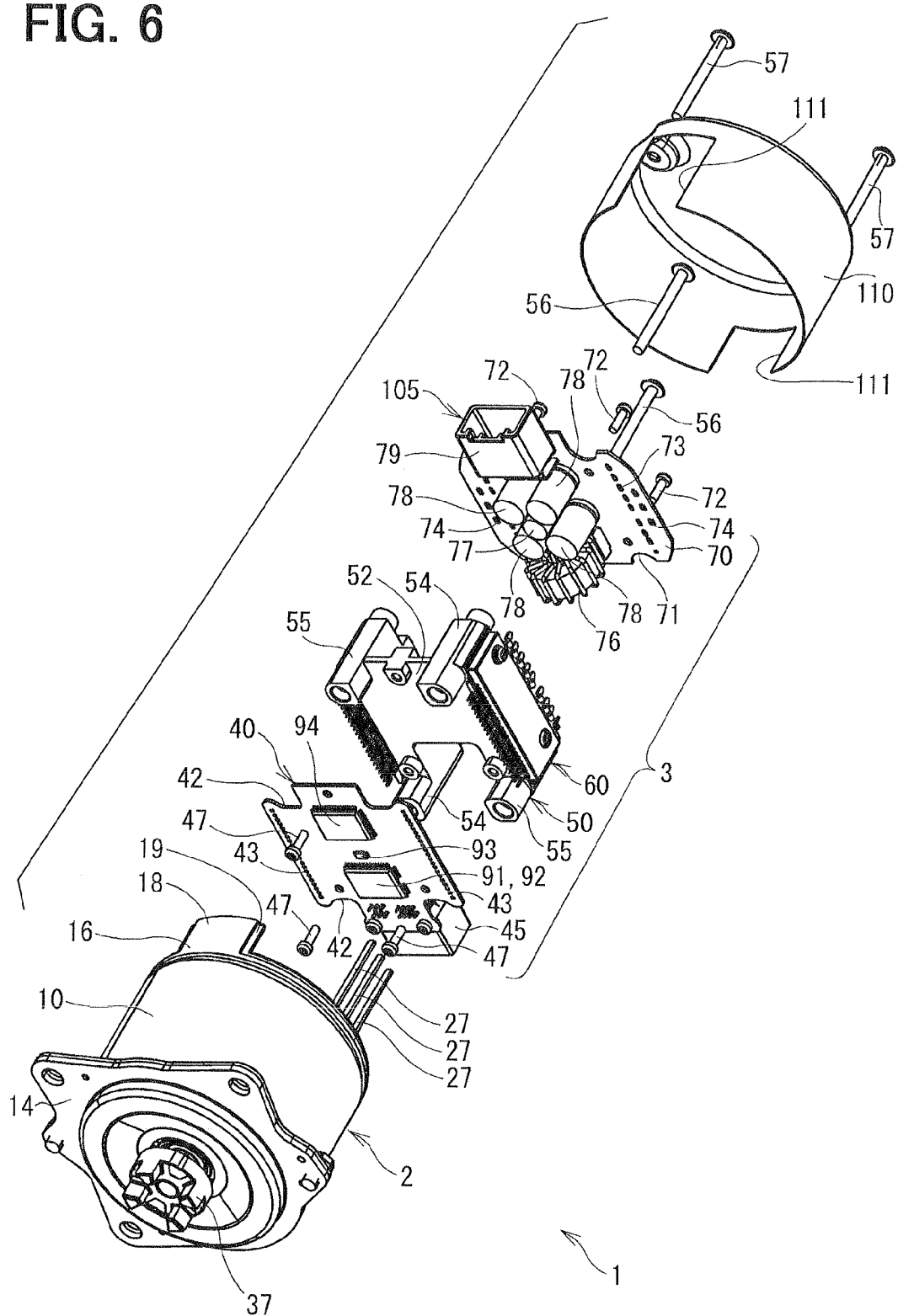
FIG. 6 is another exploded perspective view of the drive apparatus according to the first embodiment of the present invention.
Figure 7:
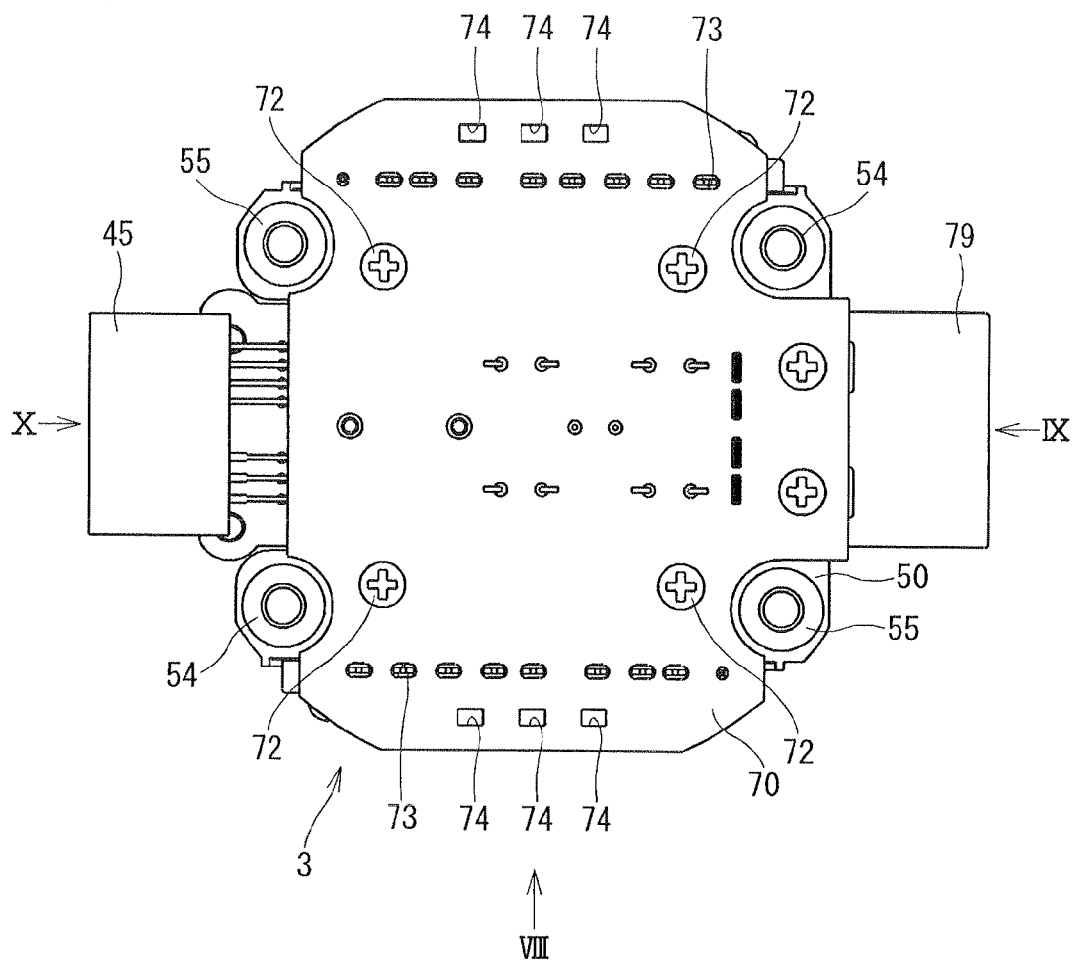
FIG. 7 is a plan view of an electronic control unit according to the first embodiment of the present invention.
Figure 8:
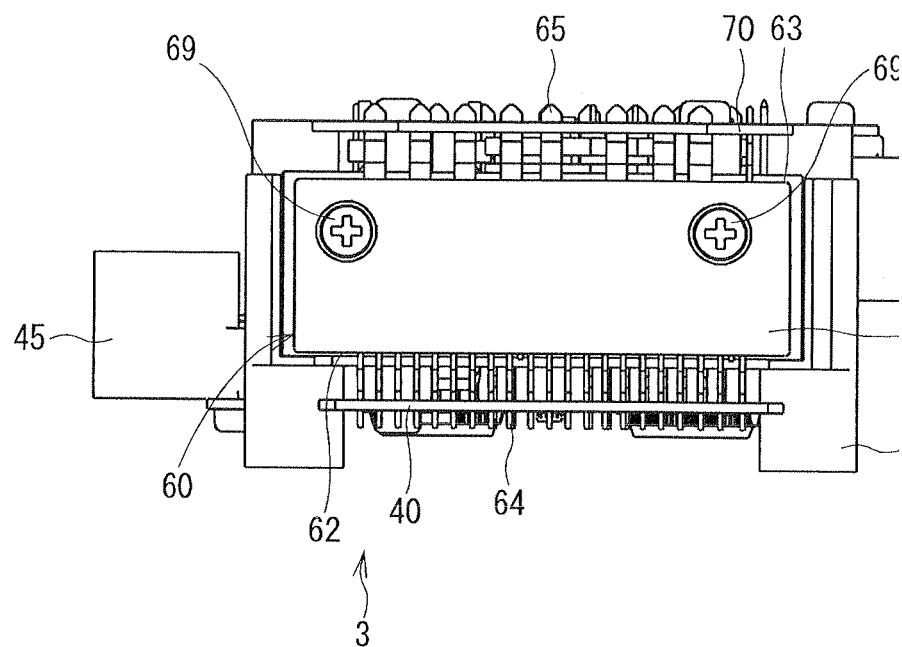
FIG. 8 is a side view of the electronic control unit viewed in a direction VIII in FIG. 7.
Figure 9:
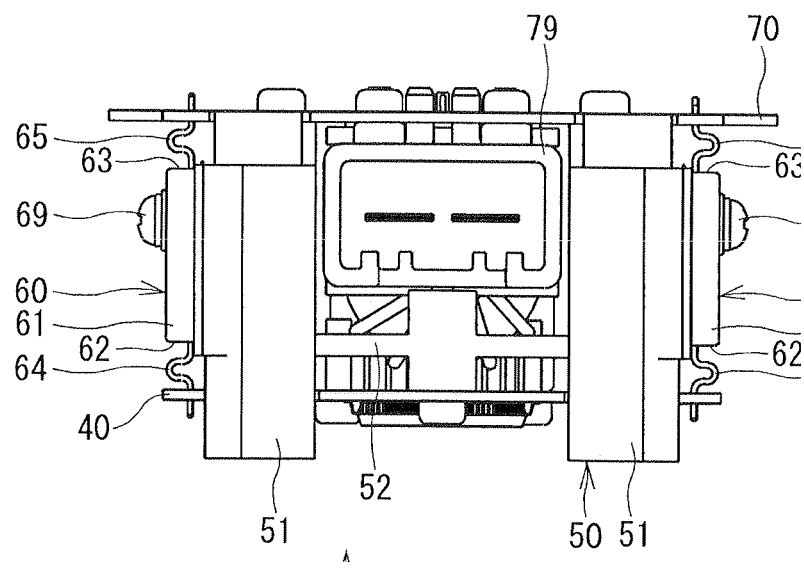
FIG. 9 is a side view of the electronic control unit viewed in a direction IX in FIG. 7.

As shown in FIGS. 5 and 6, the winding wires 26 are taken out from six locations to form motor leads (lead wires) 27. The motor leads 27 pass through six holes 17 formed in the resin guide 16. Thus, the motor leads 27 are positioned by the resin guide 16 and surely insulated from the motor case 10. The motor leads 27 are taken out towards the electronic control unit 3 and connected to the power circuit substrate 70 through the control circuit substrate 40 and a radially outside part of the power module 60. That is, the motor leads 27 are located radially outside the power module 60 when viewed in the axial direction of the motor 2. The motor leads 27 extend to the power circuit substrate across the power module 60 in a radial outside region of the power module 60.

As shown in FIGS. 5 and 6, the electronic control unit 3 is provided within a motor case area in the radial direction of the motor 2. The motor case area is formed when the motor case 10 is projected in the axial direction. From the motor 2 side, the electronic control unit 3 has the control circuit substrate 40, the heat sink 50 and the power module 60, and the power circuit substrate 70 in the axial direction of the motor 2 arranged in this order.

Figure 15:
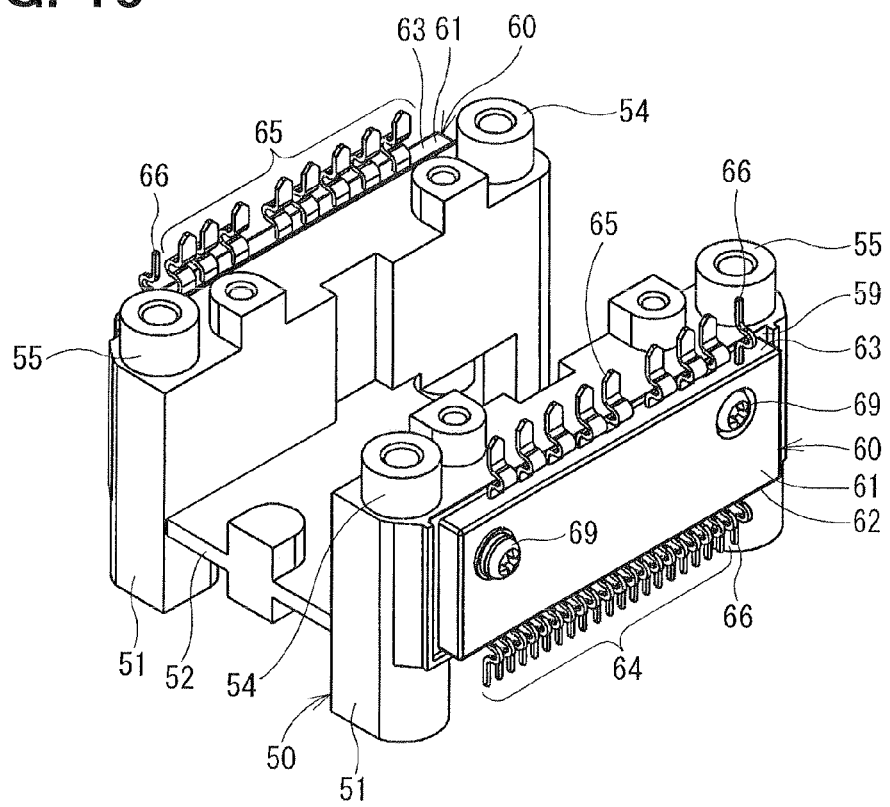
FIG. 15 is a perspective view of the power circuit substrate, in which the power module is assembled to the heat sink, according to the first embodiment of the present invention.

The control circuit substrate 40 is a substrate of four layers formed of, for example, glass epoxy substrate and formed in a generally rectangular plate shape as shown in FIG. 15 so that it is within the motor case area. The four corners of the control circuit substrate 40 are formed four notches 42 for assembling the heat sink 50 to the motor case 10. The control circuit substrate 40 is screw-fitted to the heat sink 50 from the motor 2 side by screws 47.

Figure 19:
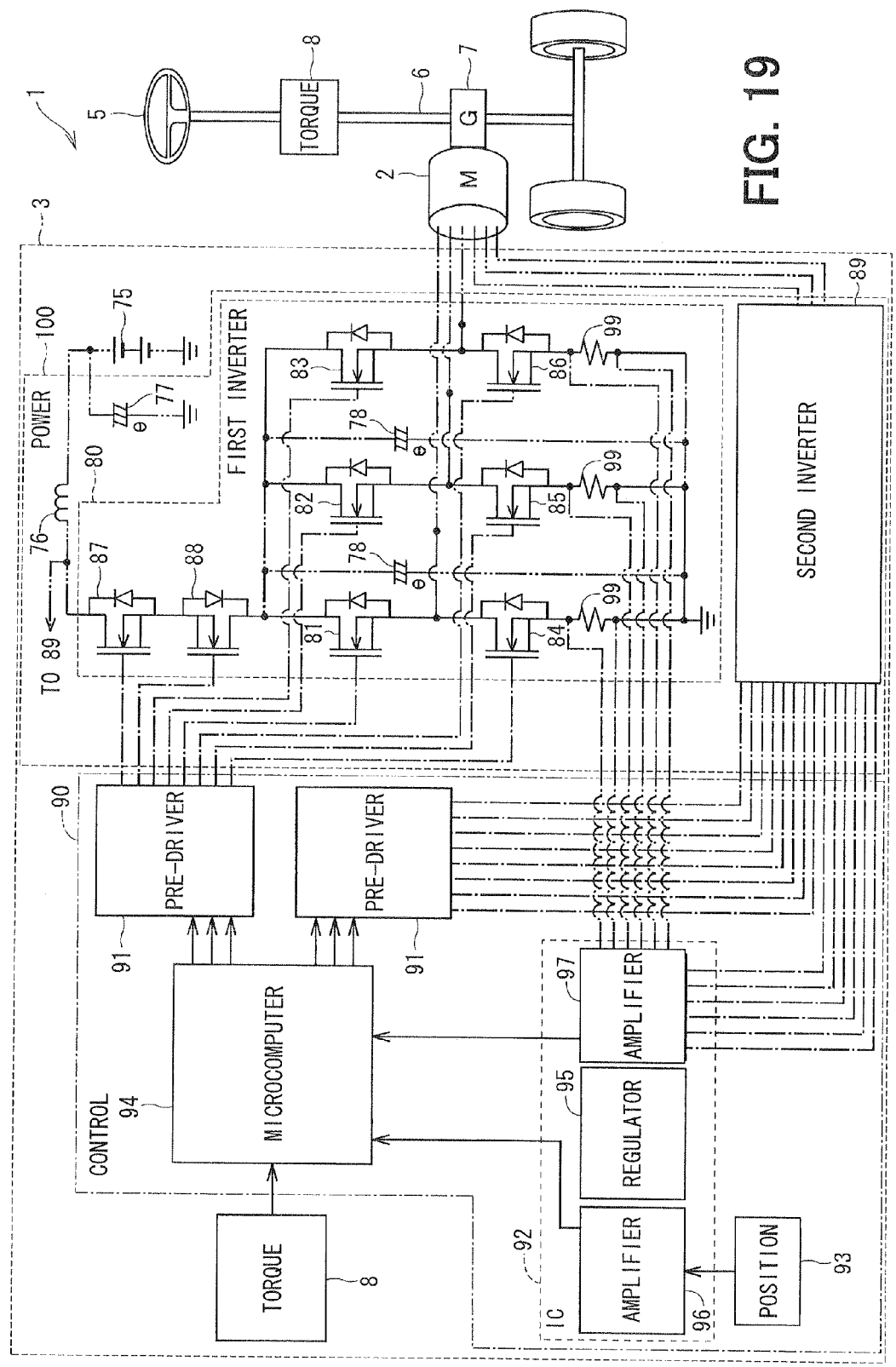
FIG. 19 is a schematic diagram showing control wiring and power wiring according to the first embodiment of the present invention.

The control circuit substrate 40 has a variety of electronic components, which form the control circuit 90 and are mounted on the control circuit substrate 40. The pre-driver circuit 91, the customized IC 92, the position sensor 93 and the microcomputer 94 are mounted on the surface of the control circuit substrate 40 at the motor 2 side. A correspondence relationship between the control circuit substrate 40 and a circuit configuration is that wires shown by chain lines in FIG. 19 and components enclosed in a chain line in FIG. 19 are mounted on the control circuit substrate 40.

The position sensor 93 is provided generally at the center of the control circuit substrate 40 in facing relation to the magnet 36 of the shaft 35. With this arrangement, rotation of the shaft 35 is detected by detecting changes in magnetic field provided by the magnet 36, which rotates with the shaft 35. The control circuit substrate 40 also has a plurality of through holes 43 formed along the outer periphery of both ends of longer sides. The through holes 43 are for connection to control terminals 64 of the power module 60. A control connector 45 is attached to the control circuit substrate 40 on the opposite side of the motor 2. The control connector 45 is located one end of shorter side of the control circuit substrate 40. The control connector 45 is configured to be connected with wires from the radial outside region of the motor 2 and sensor information from various sensors is inputted to the control connector 45.

The heat sink 50 has two heat radiation blocks 51 as column-shaped parts formed to be distanced or spaced apart from each other. A connection part 52 is provided between the two heat radiation blocks 51. The two heat radiation blocks 51 and the connection part 52 are formed integrally of good thermal conductivity, for example aluminum. The heat radiation blocks 51 are located radially outside the motor 2 relative to a central line, which is an imaginary extension line of an axial line of the shaft 35.

Figure 10:
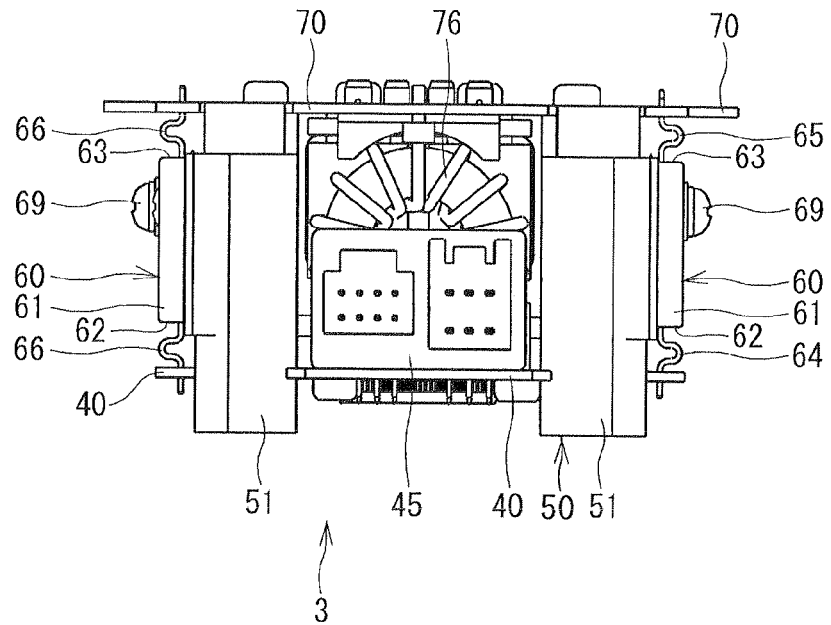
FIG. 10 is a side view of the electronic control unit viewed in a direction X in FIG. 7.
Figure 11:
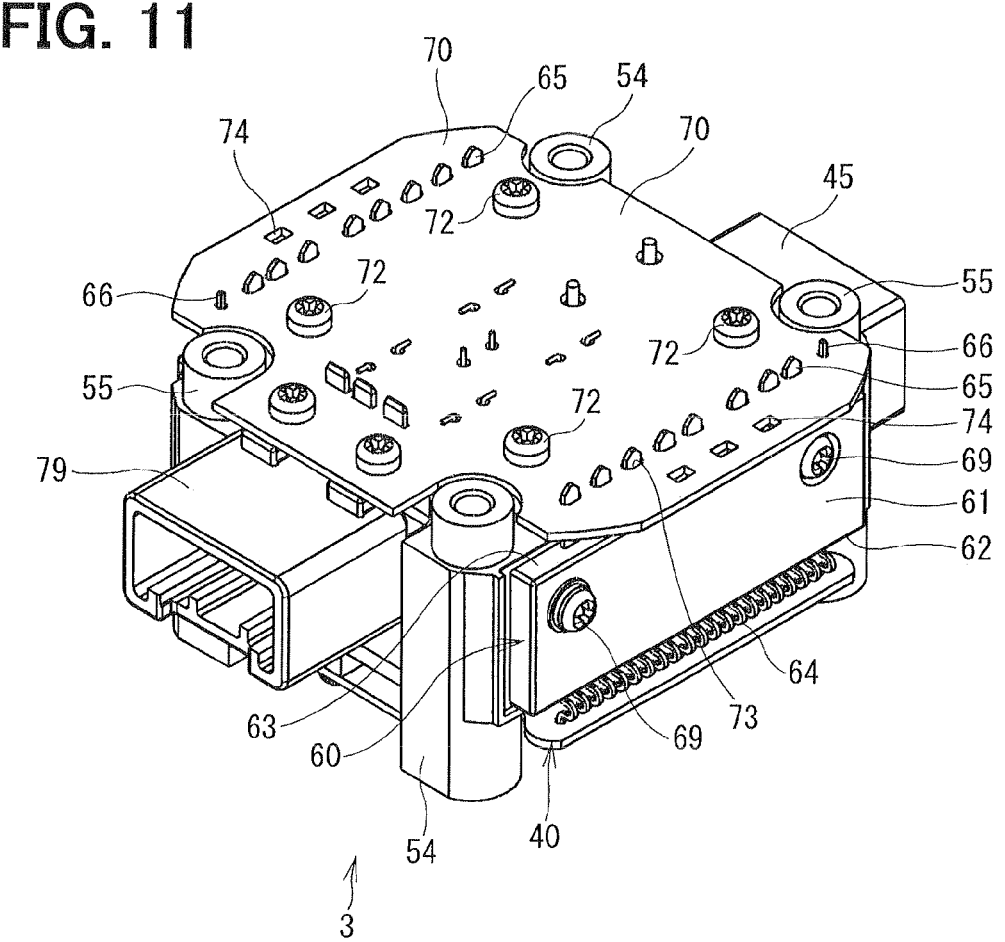
FIG. 11 is a perspective view of the electronic control unit according to the first embodiment of the present invention.
Figure 12:
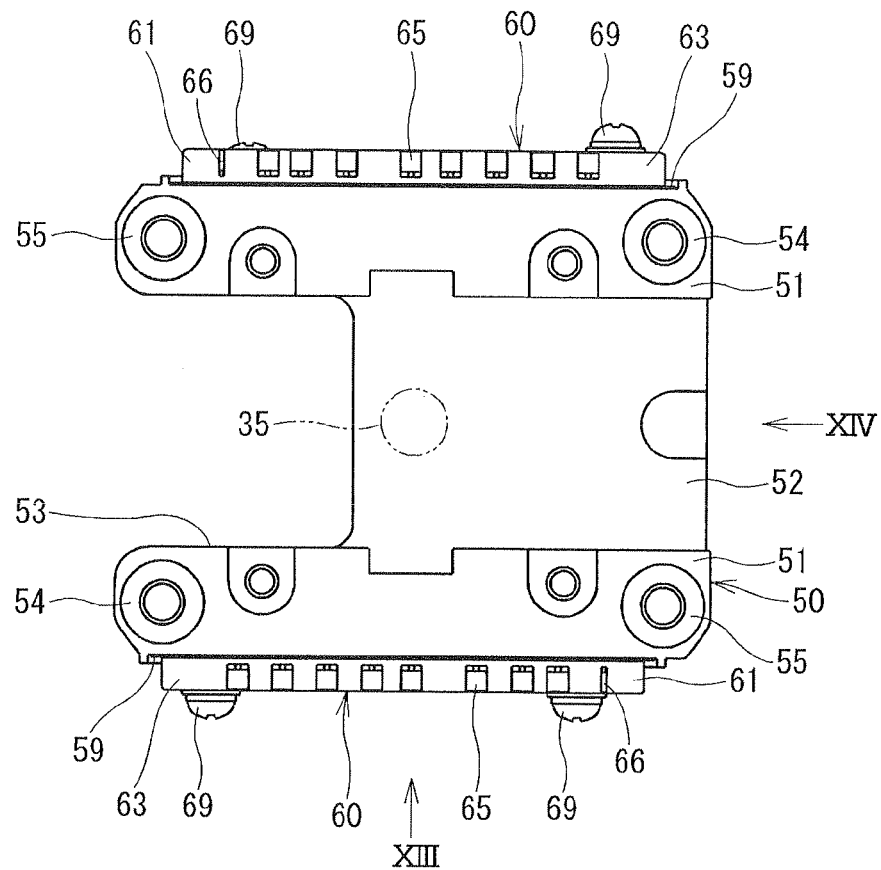
FIG. 12 is a plan view of the power circuit substrate, in which a power module is assembled to a heat sink, according to the first embodiment of the present invention.
Figure 13:
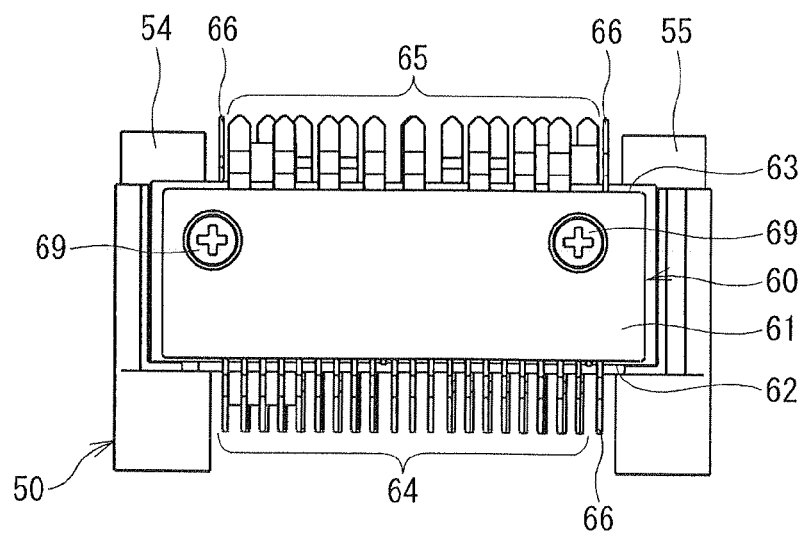
FIG. 13 is a side view of the power circuit substrate viewed in a direction XIII in FIG. 12.
Figure 14:
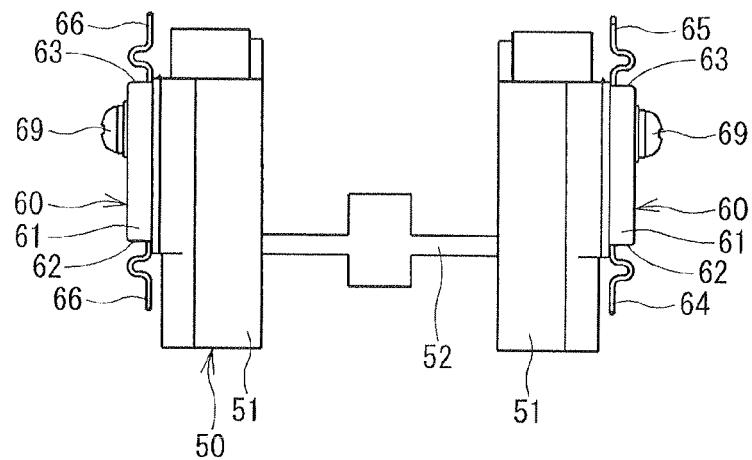
FIG. 14 is a side view of the power circuit substrate viewed in a direction XIV in FIG. 12.

As shown in FIG. 14, the heat sink 50 is formed generally in an H-shape when viewed in a direction XIV in FIG. 12. As shown in FIG. 12, the heat sink 50 is formed in an open-square shape when viewed in the axial direction of the motor 2. As shown in FIG. 10, the control connector 45 is inserted to a concave part 53, which is formed by radially inside surfaces of the two heat radiation blocks 51 and the connection part 52.

The heat radiation blocks 51 are each formed in a wide column shape. Each heat radiation block 51 has connection parts 54 and 55 at its both ends. The connection parts 54 and 55 are formed through holes in the axial direction of the motor 2. A screw 56 is inserted in the connection part 54 and screw-fitted to the motor case 10. Further, a screw 57 is inserted into the connection part 55 and screw-fitted to the motor case 10 together with a cover 110. The connection part 54 of one heat radiation block 51 and the connection part 54 of the other heat radiation block 51 are arranged to be in point-symmetry relative to the center line of the shaft 35. Similarly, the connection part 55 of one heat radiation block 51 and the connection part 55 of the other heat radiation block 51 are arranged to be in point-symmetry relative to the center line of the shaft 35.

A heat receiving surface 59 has a wide wall surface formed on the radially outside surface of the heat radiation block 51 in the radial direction of the motor case 10. The heat receiving surface 59 is arranged in a rising direction from an end surface of the motor case 10 formed in the axial direction. The heat receiving surface 59 is generally perpendicular to an end surface wall 13 of the motor case 10, which is formed in the axial direction of the motor case 10.

The power module 60 is provided on a radially outside surface of the heat sink 50 in the radial direction of the motor 2, and disposed along the heat receiving surface 59. That is, the power module 60 is provided longitudinally on a radially outside surface of the heat sink 50 in the radial direction of the motor 2. The power module 60 is disposed along each of the two heat radiation blocks 51.

The power module 60 has the control terminals 64 and power terminals 65. The control terminals 64 and the power terminals 65 are protruded from a mold part 61.

The control terminals 64 are formed on a first narrow end surface 62, which is perpendicular to the wide wall surface of the mold part 61. The power terminals 65 are formed on a second narrow end surface 63, which is perpendicular to the wide surface of the mold part 61 and faces the first narrow end surface 62 in parallel. The power module 60 is located longitudinally along the heat receiving surface 59 of the heat sink 50 in such a manner that the first end surface 62, on which the control terminals 64 are formed, is at the control circuit substrate 40 side, and the second end surface 63, on which the power terminals 65 are formed, is at the power circuit substrate 70 side. That is, the control terminals 64 are protruded facing the control circuit substrate 40 side and the power terminals 65 are protruded facing the power circuit substrate 70 side.

The control terminals 64 are inserted into the through holes 43 of the control circuit substrate 40 and electrically connected to the control circuit substrate 40 by soldering or the like. Control signals are outputted to the power module 60 from the control circuit substrate 40 through the control terminals 64. The power terminals 65 are inserted into the through holes 73, which are to be described below, formed in the power circuit substrate 70 and electrically connected to the power circuit substrate 70 by soldering or the like. The power terminals 65 carry the drive currents for the winding wires 26 to the power module 60. Only small currents (for example, 2 A), which are required to control driving the motor 2, are supplied to the control circuit substrate 40 side. On the other hand, large currents (for example, 80 A), which are required to drive the motor 2, are supplied to the power circuit substrate 70 side. Therefore, the power terminals 65 are formed thicker than the control terminals 64.

A control ground terminal 66 is formed to have the similar thickness as the control terminal 64. The ground terminal 66 passes through the mold part 61 and connects the control circuit substrate 40 to the ground of the power circuit substrate 70.

The power module 60 has MOSs 81 to 86, which are switched over on/off states to supply drive currents to the winding wires. The MOSs 81 to 86 are switching elements. The power module 60 is formed in such a manner that the switching elements MOSs 81 to 86, the power supply relays 87 and 88 and the shunt resistors 99 are mounted on a wiring pattern formed of copper, and are electrically connected with wires and the like, and are molded into the mold part 61. Two power modules 60 form the inverter circuits 80 and 89 shown in FIG. 1.

One power module 60 corresponds to the inverter circuit 80, and has the MOSs 81 to 86, the power supply relays 87, 88 and the shunt resistors 99 shown in FIG. 1. That is the MOSs 81 to 86, the power supply relays 87, 88 and the shunt resistors 99 are resin-molded into a single body as a module. The other power module 60 corresponds to the inverter circuit 89 and has the MOSs, the power supply relays and the shunt resistors, which form the inverter circuit 89. That is, one power module 60 corresponds to an inverter circuit of one system.

That is, one power module 60, which forms one inverter circuit, is provided to one heat radiation block 51 in each system.

A thin heat radiation sheet, which is not shown, is provided between the power module 60 and the heat sink 50. The power module 60 is screw-fitted by screws 69 to the heat sink 50 together with the heat radiation sheet. Thus, the power module 60 is fixed to the heat sink 50 through the heat radiation sheet so that heat generated by current supply is radiated to the heat sink 50 through the heat radiation sheet. Although not shown, a part of the wiring pattern is exposed partly as a metallic heat radiation part from the mold part 61 on the surface of the power module 60, which is at the heat sink 50 side. Heat is thus radiated efficiently, because the metallic heat radiation part contacts the heat sink 50 through the heat radiation sheet. The heat radiation sheet conducts heat from the power module 60 to the heat sink 50 and ensures insulation between the power module 60 and the heat sink 50. That is, the heat radiation sheet functions as a heat radiation member and an insulator.

The power circuit substrate 70 is a substrate of four layers, which is made of glass epoxy plate, for example, and is formed in a generally square plate shape so that it is within the motor case area. The power circuit substrate 70 has thick pattern copper foils. Four corners of the power circuit substrate 70 have four notches 71 to assure spaces for connection parts 55 of the heat sink 50. The power circuit substrate 70 is screw-fitted to the heat sink 50 by screws 72 from a side, which is opposite to the motor 2.

Power supply wirings are formed on the power circuit substrate 70 to supply the drive currents for the winding wires 26. Wires shown by two-dot chain lines in FIG. 19 and components enclosed in a two-dot chain line in FIG. 19 are mounted on the power circuit substrate 70.

Through holes 73 are formed on the power circuit substrate 70 so that the power terminals 65 of the power module 60 are inserted. Through holes 74 are formed outside the through holes 73 on the power circuit substrate 70 so that the motor leads 27 are inserted. The motor leads 27 are inserted into the through holes 74 and electrically connected to the power circuit substrate 70 by soldering or the like. The motor leads 27 are thus connected electrically to the power module 60 through the power circuit substrate 70. That is, the power circuit substrate 70 provides a connection part of the motor leads 27 and the power module 60. The motor leads 27 are connected to the power module 60 at the opposite side of the motor case 10 relative to the mold part 61 of the power module 60 in the axial direction of the motor case 10. The motor leads 27 are connected to the power module 60 at the opposite side of the motor 2 relative to the mold part 61 of the power module 60 in the axial direction of the motor 2.

The choke coil 76, the capacitors 77 and 78, and a power connector 79 are mounted on a surface of the power circuit substrate 70 on the motor 2 side forming a power unit 105. The power unit 105 and the power module 60 form the power circuit 100.

Figure 16:
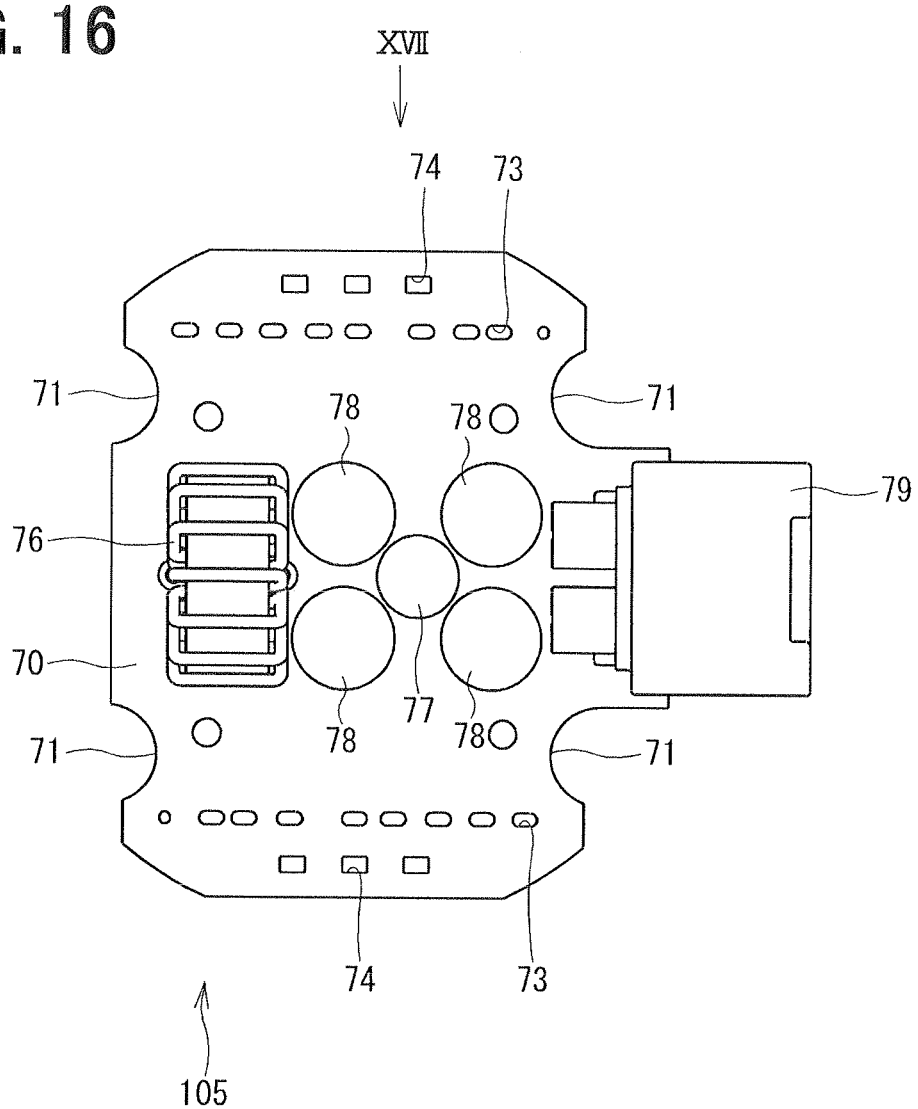
FIG. 16 is a plan view of a power unit according to the first embodiment of the present invention.
Figure 17:
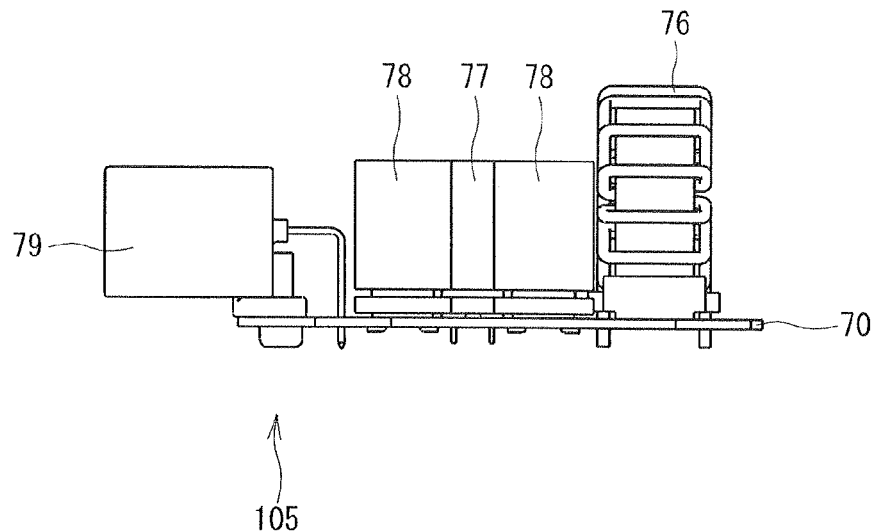
FIG. 17 is a side view of the power unit viewed in a direction XVII in FIG. 16.
Figure 18:
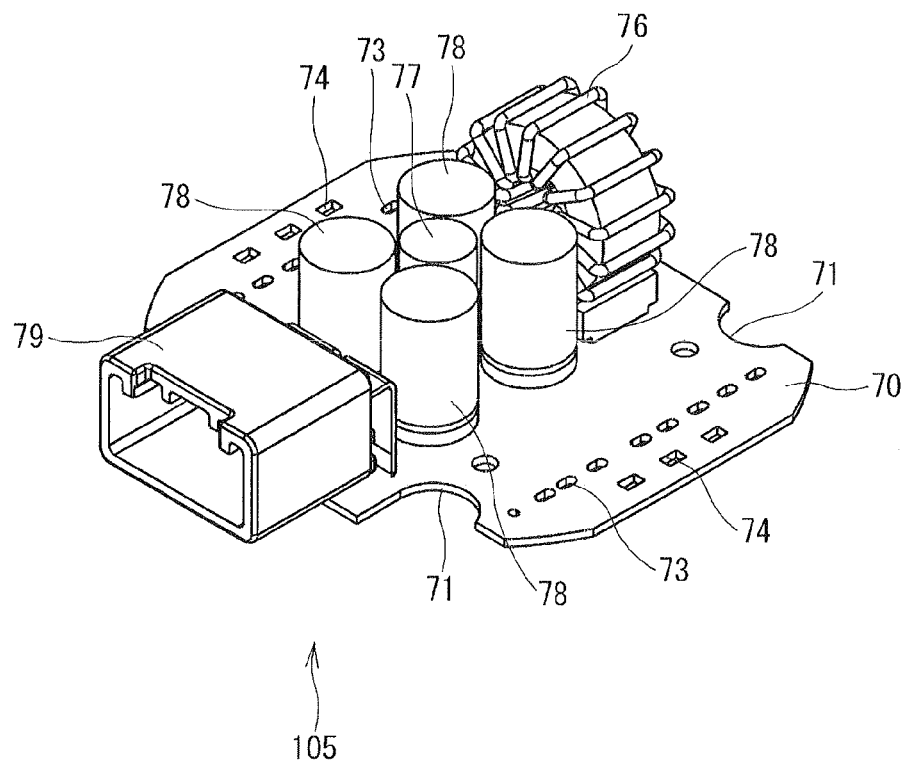
FIG. 18 is a perspective view of the power unit according to the first embodiment of the present invention.

The power unit 105 is arranged as shown in FIGS. 16 to 18.

The choke coil 76, the capacitors 77 and 78, the power connector 79, which form the power unit 105, are arranged in a space sandwiched between two heat radiation blocks. The choke coil 76, the capacitors 77, 78 and the power connector 79 are arranged in a space between the connection part 52 of the heat sink 50 and the power circuit substrate 70 in the axial direction of the motor 2. The choke coil 76, the capacitors 77, 78 and the power connector 79 are arranged linearly in this order from the control connector 45 connected to the control circuit substrate 40.

The choke coil 76 is shaped in a hollow cylinder shape to have a length in an axial direction shorter than a length in a radial direction. When viewed in the axial direction of the motor 2, the choke coil 76 and the shaft 35 are located in such a manner that they are not overlapped with each other. Further, the choke coil 76 is arranged longitudinally in such a manner that the axial line of the choke coil 76 is generally perpendicular to the axial line of the shaft 35.

The capacitor 77 is located at a substantial center among four capacitors 78. The four capacitors 78 are arranged to closely surround the capacitor 77. The capacitors 77 and 78 are aluminum electrolytic capacitors. The capacitors 78 have larger capacitance than the capacitor 77. The capacitors 77 and 78 are not limited to the aluminum electrolytic capacitors, and any capacitors with appropriate capacitances can be used.

The power connector 79 is located opposite to the control connector 45, which is connected to the control circuit substrate 40. The power connector 79 is configured to be connectable with wirings from a radially outside of the motor 2, and is connected to the power source 75. Thus, electric power from the power source 75 is supplied to the power circuit substrate 70 through the power connector 79. The electric power from the power source 75 is supplied to the winding wires 26 wound on the stator 20 through the power connector 79, the power circuit substrate 70, the power module 60 and the motor leads 27.

The electronic control unit 3 is accommodated within the cover 110 (see FIGS. 5 and 6). The cover 110 is formed of magnetic material such as iron to prevent electric field and magnetic field from leaking from the electronic control unit 3 side to an external side and prevent dust from entering into the electronic control unit 3 side. The cover 110 has generally the same diameter as the motor case 10 and formed in a bottomed cylindrical shape, which opens to the motor 2 side. The cover 110 is screw-fitted to the motor case 10 together with the heat sink 50 by screws 57. Notches 111 are formed in the cover 110 at positions, which correspond to the control connector 45 and the power connector 79. The control connector 45 and the power connector 79 protrude from the notches 111 in the radial direction and open radially in different outward directions, for example, in opposite directions. A protrusion part 18 is formed on the resin guide 16 at a position, which corresponds to the notch 111 of the power connector 79 side. A step part 19 is formed on the resin guide 16 to be fitted with the cover 110.

The operation of the drive apparatus 1 will be described below.

The microcomputer 94 provided on the control circuit substrate 40 generates a pulse signal through the pre-driver circuit 91, which is formed by PWM control, to assist vehicle steering by the steering wheel 5 in accordance with a travel speed of a vehicle based on signals supplied from the position sensor 93, the torque sensor 8, the shunt resistors 99 and the like.

This pulse signal is outputted to the inverter circuits 80 and 89 of the two power supply systems formed by the power modules 60 through the control terminals 64 so that on/off switching operation of the MOSs 81 to 86 of the power modules 60 are controlled. Thus sinusoidal wave currents, which are phase-shifted one another, are supplied to the winding wires 26 so that a rotating magnetic field is generated. The rotor 30 and the shaft 35 are rotated as a single body by the rotating magnetic field. With rotation of the shaft 35, driving force is outputted from the output end 37 to the gear 7 of the column shaft 6 so that steering operation of a driver by the steering wheel 5 is assisted.

That is, the currents flowing in the winding wires 26 are supplied for driving the motor 2. The currents flowing in the winding wires are the drive currents of the motor 2.

Heat generated at the time of switching the MOSs 81 to 86 of the power module 60 is radiated to the heat sink 50 through the heat radiation sheet. Thus, failure or erroneous operation, which will otherwise be caused by temperature rise of the power module 60, is suppressed.

The size of the stator 20, the rotor 30 and the like may be set in accordance with required output power.

The drive apparatus 1 according to the present embodiment provides the following advantages.

(1) The power module 60 is arranged in the rising direction from the end surface wall 13 formed in the axial direction of the motor case 10. That is, the power module 60 is not arranged parallel to the end surface wall 13, which is formed in the axial direction of the motor case 10, but is arranged longitudinally perpendicular to the end surface wall 13, which is formed in the axial direction of the motor case 10. Thus, a region within the motor silhouette, which is formed by projecting the motor case 10 in the axial direction, can be effectively used, and the size in the radial direction of the motor case 10 can be reduced.

(2) Since the electronic control unit 3 is located in the axial direction of the motor 2, the size of the drive apparatus 1 in the radial direction can be reduced. Since the motor 2 and the electronic control unit 3 are located by separating in the axial direction, the motor 2 and the electronic control unit 3 can be spaced apart relatively easily. For example, in a case where the output of the motor 2 is changed, it is only necessary to change heat mass of the heat sink 50. Thus, drive apparatuses of different specifications can be produced by using various parts in common. For example, if either one of the motor 2 and the electronic control unit 3 fails to operate, only the motor 2 or the electronic control unit 3, which failed, can be replaced with ease.

(3) The motor case 10, the control circuit substrate 40, the heat sink 50 and the power module 60, and the power circuit substrate 70 are arranged in the axial direction of the motor case 10 in this order, and the shaft 35 has the output end 37 at an end position, which is opposite to the control circuit substrate 40. Therefore, the shaft 35 can be configured to not penetrate the control circuit substrate 40. Since the shaft 35 is shaped short enough to not penetrate the control circuit substrate 40, axis deviation associated with the rotation of the rotor 30 can be inhibited. Further, since the shaft 35 is configured to not penetrate the control circuit substrate 40, a region within the control circuit substrate 40 can be used effectively and the size of the entirety of the apparatus can be reduced.

(4) The power circuit substrate 70, which is required to supply large currents for driving the motor, and the control circuit substrate 40, which is related to only motor drive control and is not required to supply large currents, are spaced apart. The copper foil of the control circuit substrate 40 can thus be thinned.

(5) The power module 60 and motor leads 27 are connected by the power circuit substrate 70. That is, the connection part between the power module 60 and the motor leads 27 is the power circuit substrate 70. The motor leads 27 are connected with the power module 60 at a poison opposite to the motor case 10 relative to the mold part 61 of the power module 60 in the axial direction of the motor case 10. The motor case 10, the control circuit substrate 40, the heat sink 50, the power module 60 and the power circuit substrate 70 are arranged in the axial direction of the motor case 10 in this order. Thus, the position of connection part between the motor leads 27 and the power module 60 is near an end portion in the axial direction of the entirety of the drive apparatus 1. Thus, the motor leads 27 and the power module 60 can be easily connected with each other. Further, since the position of connection part between the motor leads 27 and the power module 60 is near the end portion in the axial direction of the entirety of the drive apparatus 1, the drive apparatus 1 can be repaired easily when it fails to operate.

(6) The motor leads 27 are arranged radially outside of the power module 60. Thus, the motor leads 27 can be extended to the power wiring part over the power module 60 in the radially outside region without penetrating the radially inside space. With this arrangement of the motor leads 27, components such as the choke coil 76 and the capacitors 77, 78 can be arranged in the radially inside space. Thus, the space in the radial direction of the apparatus can be used effectively and the size of the entirety of the apparatus can be reduced.

(7) The shaft 35, the heat sink 50 and the power module 60 are arranged in this order in the radial direction of the apparatus from the inner side to the outer side (for example, see FIG. 12). Thus, the space in the radial direction of the apparatus can be used effectively and the size of the entirety of the apparatus can be reduced.

(8) The motor leads 27 and the power module 60 are connected by the power circuit substrate 70. With this arrangement, a connecting process between the power terminals 65 and the power circuit substrate 70 and a connecting process between the motor leads 27 and the power circuit substrate 70 can be performed in one connecting process. Thus the manufacturing process can be simplified.

(9) The heat sink 50 has two heat radiation blocks 51 spaced apart from each other. Thus, the heat generated by the power module 60 can be distributed by the heat radiation block 51.

(10) Two power modules 60 respectively form the inverter circuits 80 and 89. Two power modules 60 are formed in correspondence with two power supply system. The power supply systems are provided in such a manner that one power supply system corresponds to one heat radiation block 51. Since the heat generated by each power module 60 is equivalent, the generated heat can be radiated in a balanced manner by providing one power module 60, which forms one power supply system, to one heat radiation block 51.

(Second Embodiment)

Figure 20:
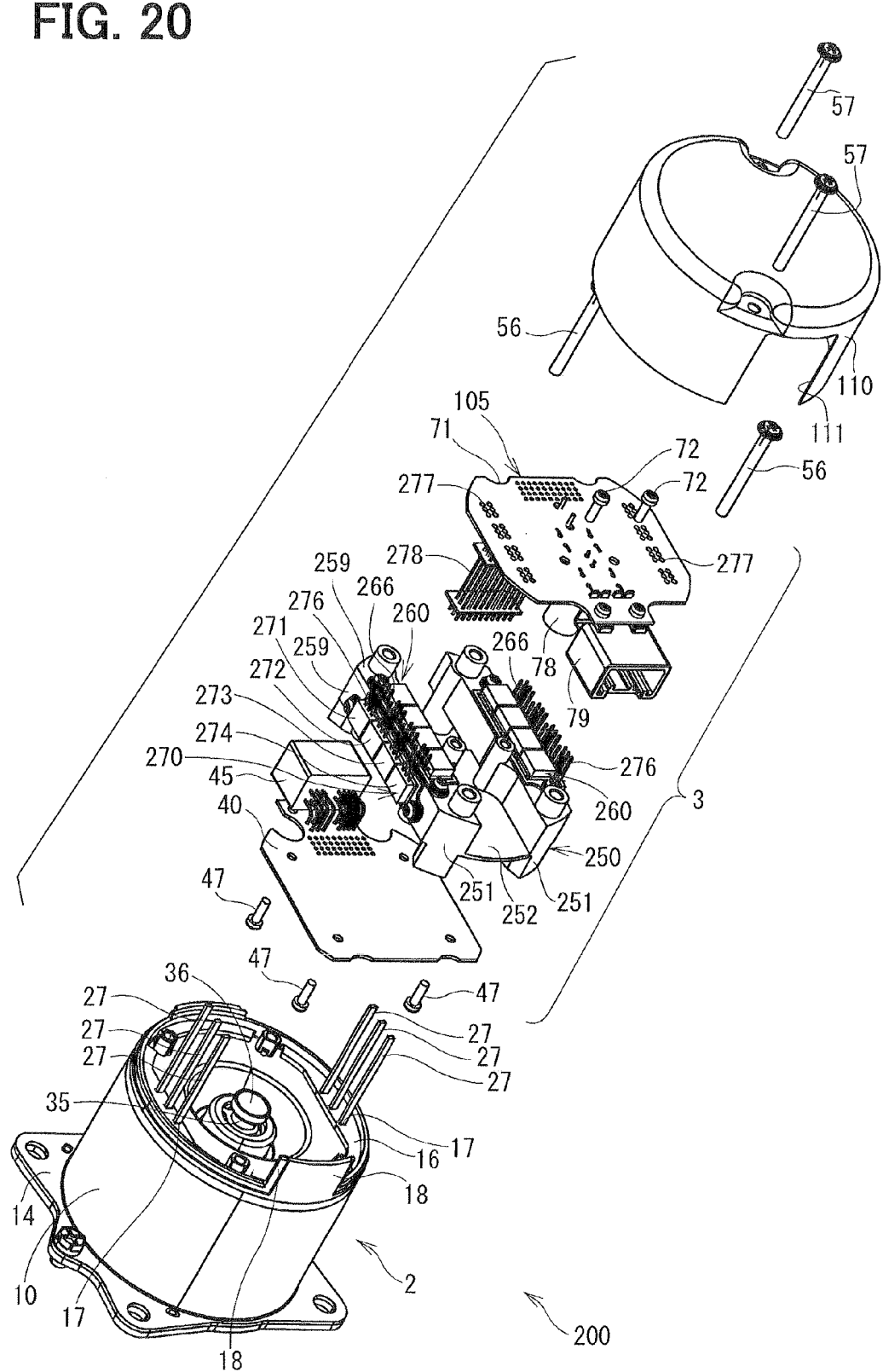
FIG. 20 is an exploded perspective view of a drive apparatus according to a second embodiment of the present invention.
Figure 21:
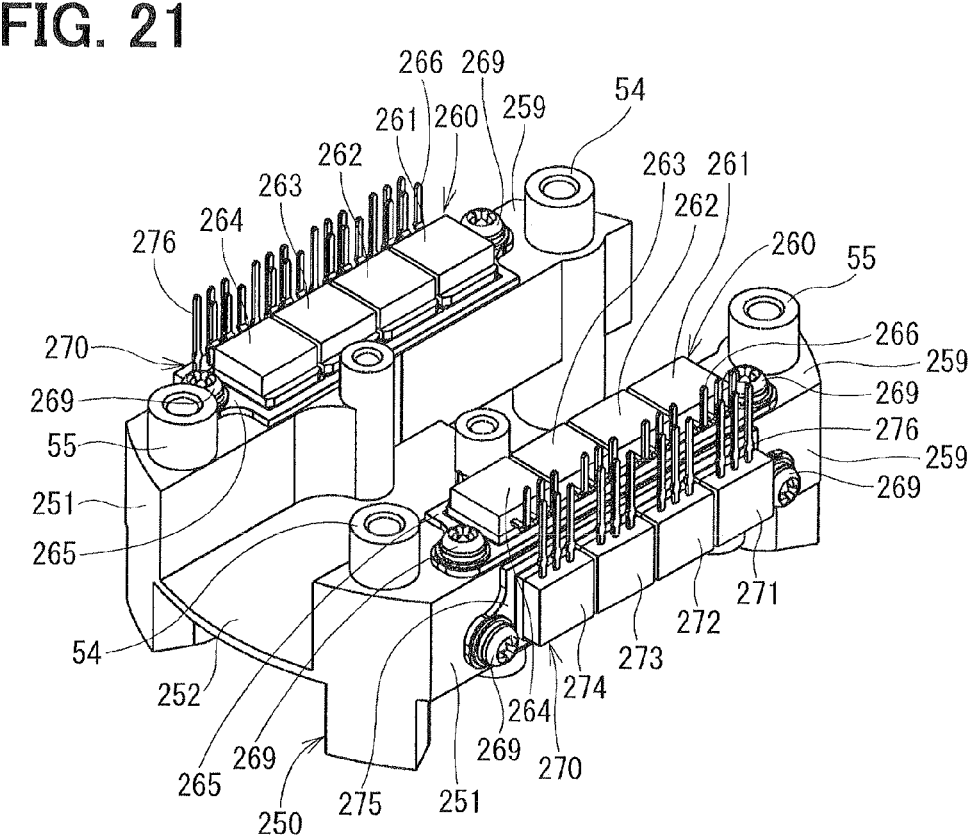
FIG. 21 is a perspective view of a power circuit substrate, in which a power module is assembled to a heat sink, according to the second embodiment of the present invention.

A drive apparatus 2 according to a second embodiment is shown in FIGS. 20 and 21. Similarly to the first embodiment, in the drive apparatus 2, a heat sink 250 has two heat radiation blocks 251 as column-shaped parts formed to be distanced or spaced apart from each other. A connection part 252 is provided between the two heat radiation blocks 251. The two heat radiation blocks 251 and the connection part 252 are formed integrally of good thermal conductivity, for example aluminum. A radially outside surface of the heat sink 250 in the radial direction of the motor case 10, and a surface located on the power circuit substrate 70 side provide heat receiving surfaces 259. Each of the heat radiation blocks 251 has two module units 260 and 270. One module unit 260 is located on a surface of the heat radiation block 251 facing the power circuit substrate 70. That is, the module unit 260 is arranged generally parallel to the end surface wall 13 formed in the axial direction of the motor case 10. The other module unit 270 is on a surface of the heat radiation block 251, the surface is arranged radially outside of the motor 2 in the radial direction of the motor 2, and is arranged in the rising direction of the end surface wall 13 formed in the axial direction of the motor case 10. That is, the module unit 270 is located in the longitudinal direction relative to the end surface wall 13 formed in the axial direction of the motor case 10.

The module unit 260 has four semiconductor modules 261 to 264 and a wiring substrate 265. Each of the semiconductor modules 261 to 264 is formed with three terminals 266 on a narrow surface, which is perpendicular to a wide surface. The terminals 266 of the semiconductor modules 261 to 264 are arranged to protrude in the radially outward direction of the motor 2. The terminals 266 are bent at generally a right angle toward the power circuit substrate 70 side.

The module unit 270 has four semiconductor modules 271 to 274 and a wiring substrate 275. Each of the semiconductor modules 271 to 274 has three terminals 276 on a narrow surface, which is perpendicular to a wide surface. The terminals 276 are arranged on the power circuit substrate 70 side.

The terminals 266 of the semiconductor modules 261 to 264 and the terminals of the semiconductor modules 271 to 274 are inserted into through holes 277 formed on the power circuit substrate 70 and electrically connected to the power circuit substrate 70 by soldering or the like.

The motor leads 27 are inserted into through holes, which are not shown and are formed outside the through holes 277 on the power circuit substrate 70, and are electrically connected to the power circuit substrate 70 by soldering or the like. Thus, the motor leads 27 are connected to the power module units 260 and 270 through the power circuit substrate 70.

Similarly to the first embodiment, the power circuit substrate 70 forms a connection part for connecting the motor leads 27 and the power module 60. The motor leads 27 are connected to the power module 60 at the opposite side of the motor case 10 relative to the mold part 61 of the power module 60 in the axial direction of the motor case 10. That is, the motor leads 27 are connected to the power module 60 at the opposite side of the motor 2 relative to the mold part 61 of the power module 60 in the axial direction of the motor 2.

The module units 260 and 270 are screw-fitted to the heat sink 250 by screws 269. The wiring substrates 265 and 275, on which the semiconductor modules 261 to 264 and 271 to 274 are mounted, are made of aluminum and the outside surface is made of resin layer. The resin layer functions as an insulation layer to assure the semiconductor modules 261 to 264 and 271 to 274 are insulated from the heat sink.

According to the present embodiment, in the module unit 260, the semiconductor modules 261 to 264 mounted on the wiring substrate 265. In the module unit 270, the semiconductor modules 271 to 274 are mounted on the wiring substrate 275. The module units 260 and 270 are screw-fitted to the heat sink 250. Alternatively, the semiconductor modules 261 to 264 and 271 to 274 may be fitted to the heat sink 250 without the wiring substrates 265 and 275. In this case, insulation sheets need to be provided between the semiconductor modules 261 to 264 and the heat sink 250, and between the semiconductor modules 271 to 274 and the heat sink 250. Alternatively, a semiconductor module, in which drain electrodes are coated with resin for insulation purpose, may be used when the insulation sheets are not provided.

The terminals 266 and 276 form terminal parts of the semiconductor modules 261 to 264 and 271 to 274 to the power module 60.

Each of the semiconductor modules 261 to 264 and 271 to 274, which form the module units 260 and 270, has one MOS. The module units 260 and 270 arranged in the longitudinal direction on one heat radiation block 251 correspond to the first inverter circuit 80. The module units 260 and 270 arranged on the other heat radiation block 251 correspond to the second inverter circuit 89. Thus, one power module 60, which forms one power supply system, is arranged relative to one heat radiation block 51. Similarly to the first embodiment, the inverter circuit 80 and the inverter circuit 89 are similar to each other, and only the module units 260 and 270 corresponding to the inverter circuit 80 will be described.

In the module unit 260, which is located on the surface of the heat radiation block 251 facing the power circuit substrate 70, the semiconductor module 261 has the power supply relay 87, the semiconductor module 262 has the MOS 81, the semiconductor module 263 has the MOS 82 and the semiconductor module 264 has the MOS 83. That is, the module unit 260 has MOSs 81 to 83, which are arranged on the power supply line side, and one power supply relay 87. The module unit 260 has MOSs 81 to 83, which are arranged on the power supply line side, and form the upstream (high potential) side circuit.

In the module unit 270, which is located longitudinally on the surface of the heat radiation block 251 at a radially outside position, the semiconductor module 271 has the power supply relay 88, the semiconductor module 272 has the MOS 84, the semiconductor module 273 has the MOS 85 and the semiconductor module 274 has the MOS 86. That is, the module unit 270 has MOSs 84 to 86, which are arranged on the ground line side, and one power supply relay 88. The module unit 270 has MOSs 84 to 86, which are arranged on the ground line side, and form the downstream (low potential) side circuit.

The semiconductor module 262, which has the MOS 81 connected to the U-phase coil, and the semiconductor module 272, which has the MOS 84 connected to the U-phase coil, are formed to sandwich a periphery side line of the heat radiation block 251. The periphery side line of the heat radiation block 251 is located radially outside facing the power circuit substrate 70 side. Similarly, the semiconductor module 263, which has the MOS 82 connected to the V-phase coil, and the semiconductor module 273, which has the MOS 85 connected to the V-phase coil, are formed to sandwich the periphery side line of the heat radiation block 251. The periphery side line of the heat radiation block 251 is located radially outside facing the power circuit substrate 70 side. Similarly, the semiconductor module 264, which has the MOS 83 connected to the W-phase coil, and the semiconductor module 274, which has the MOS 86 connected to the W-phase coil, are formed to sandwich the periphery side line of the heat radiation block 251. The periphery side line of the heat radiation block 251 is located radially outside facing the power circuit substrate 70 side. Further, the semiconductor module 261, which has the power supply relay 87, and the semiconductor module 271, which has the power supply relay 88, are formed to sandwich the periphery side line of the heat radiation block 251. The periphery side line of the heat radiation block 251 is located radially outside facing the power circuit substrate 70 side. By this arrangement, wiring loss can be reduced.

The semiconductor modules 261 to 264 and 271 to 274 do not have terminals, which directly connect to the control circuit substrate 40. Therefore, the control circuit substrate 40 and the power circuit substrate 70 are electrically connected by way of substrate connecting terminals 278. The control circuit substrate 40 and the semiconductor modules 261 to 264 and 271 to 274 are electrically connected by way of substrate connection terminals 278 and the power circuit substrate 70. Control signals outputted from the control circuit substrate 40 are supplied to the semiconductor modules 261 to 264 and 271 to 274 by way of the substrate connecting terminals 278 and the power circuit substrate 70 to control on/off of the MOSs in the semiconductor modules 261 to 264 and 271 to 274. Thus, driving the motor 2 is controlled in the similar manner as in the first embodiment.

The drive apparatus 2 according to the second embodiment provides advantages similar to the above-described advantages (1) to (10).

(Third Embodiment)

Figure 22:
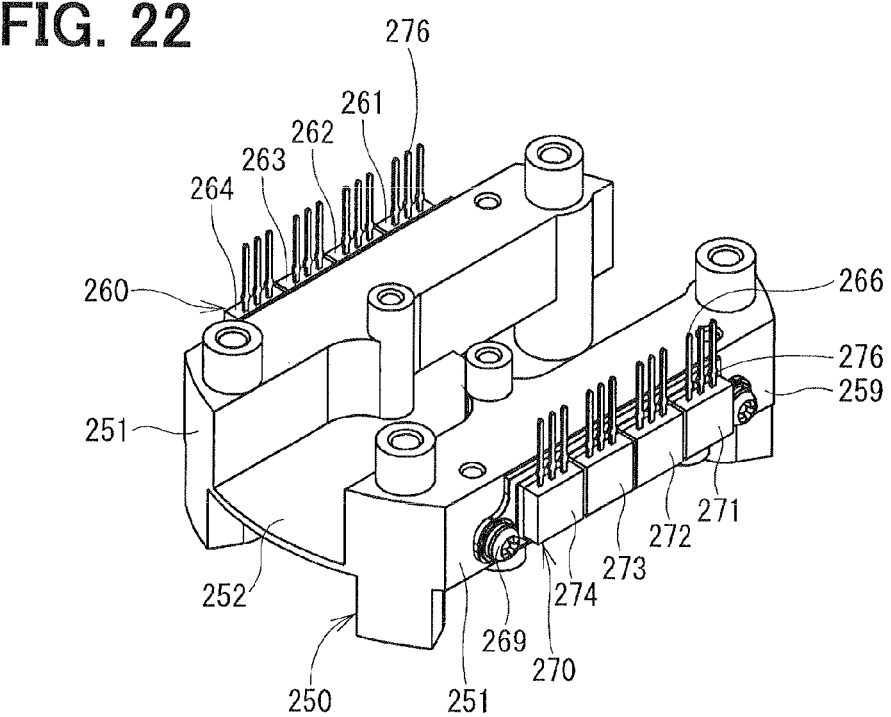
FIG. 22 is a perspective view of a power circuit substrate, in which a power module is assembled to a heat sink, according to a third embodiment of the present invention.

A third embodiment is different from the second embodiment in that the motor 2 is driven by only one inverter circuit system. The heat sink 250 and module units 260 and 270 according to the third embodiment are shown in FIG. 22.

The module unit 260, which is the upstream side circuit, is longitudinally provided radially outside of one heat radiation block 251. The module unit 270, which is the downstream side circuit, is longitudinally provided radially outside of the other heat radiation block 251. Module units are not provided on the surfaces facing to the power circuit substrate 70. Thus, differently from the second embodiment, the radially outside surfaces of the heat sinks 250 provide the heat receiving surfaces 259.

The drive apparatus according to the third embodiment provides advantages similar to the above-described advantages (1) to (9).

Further, since the semiconductor modules 261 to 264 and the semiconductor modules 271 to 274 are respectively provided to each of the two heat radiation blocks 251, heat generated by the semiconductor modules can be radiated effectively.

The control circuit substrate 40 is formed of a glass epoxy substrate as one example and the power circuit substrate 70 is formed of a glass epoxy substrate having thick copper foils as an example. However, the control circuit substrate 40 and the power circuit substrate 70 may be formed of any other types of substrates.

(Fourth Embodiment)

A drive apparatus 400 according to a fourth embodiment is shown in FIGS. 23 to 26. In the drive apparatus, the power wiring part is provided by bus bars.

Figure 23:
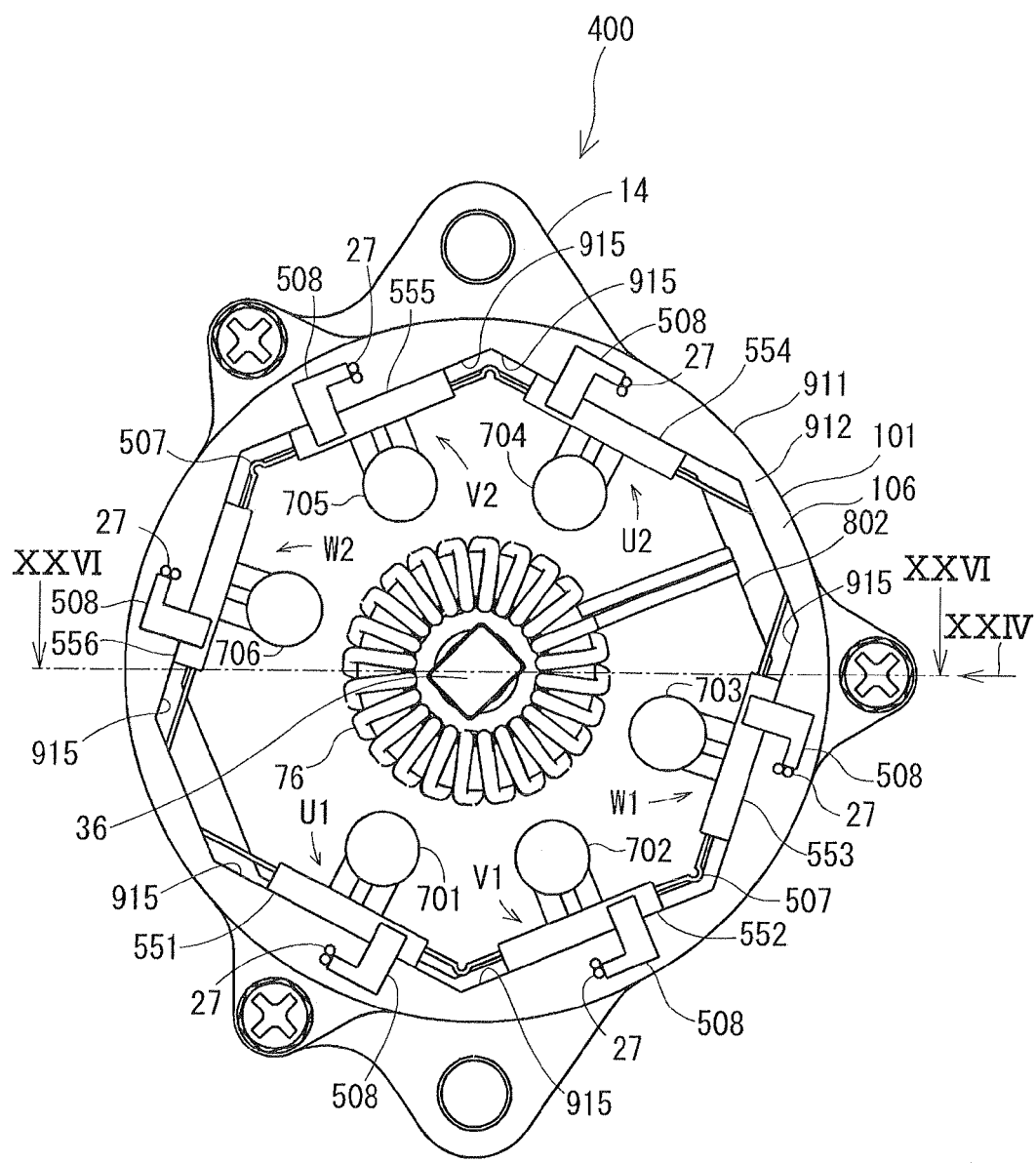
FIG. 23 is a plan view of a drive apparatus according to a fourth embodiment of the present invention.
Figure 24:
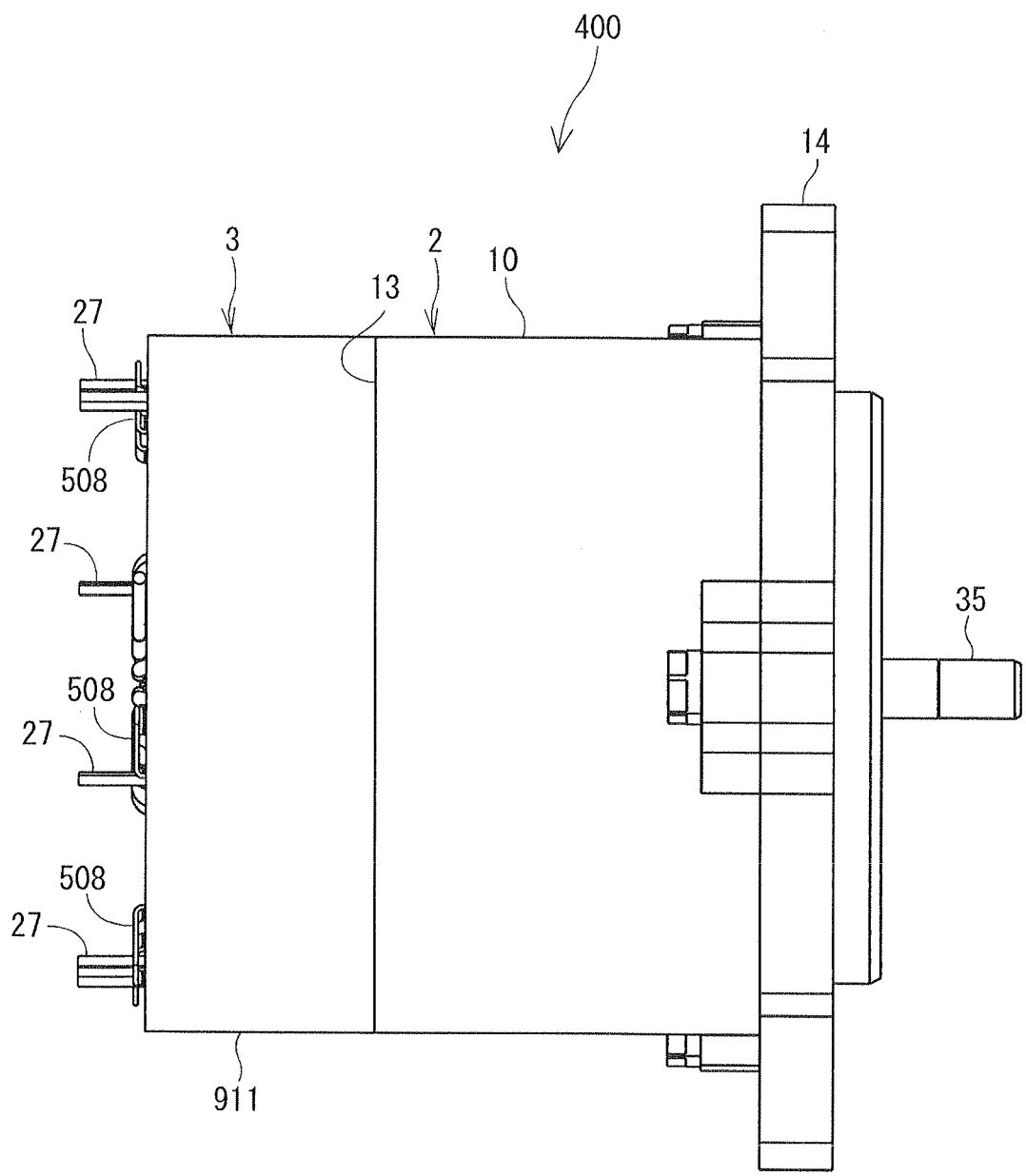
FIG. 24 is a side view of the drive apparatus viewed in a direction XXIV in FIG. 23.
Figure 25:
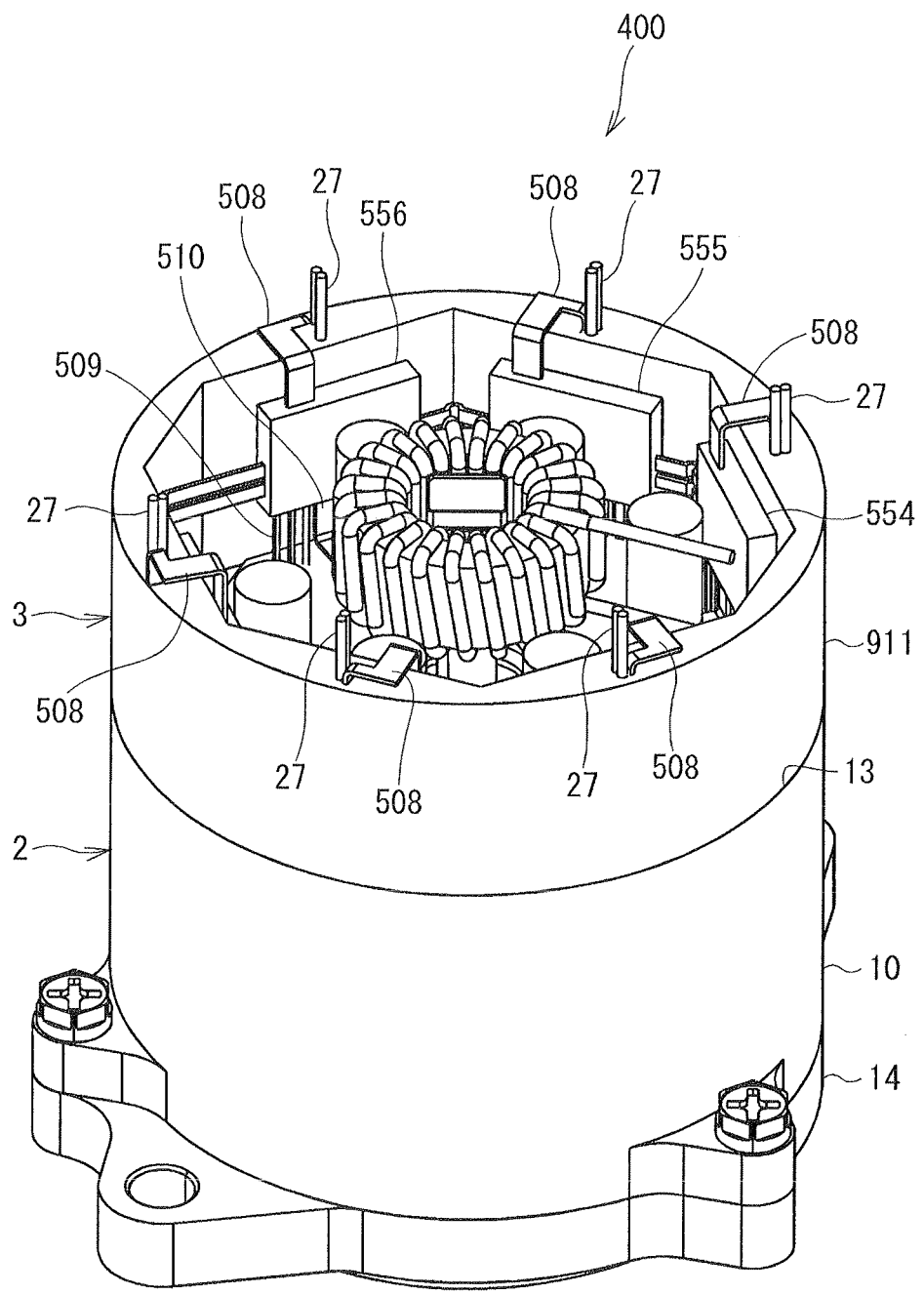
FIG. 25 is a perspective view of the drive apparatus according to the fourth embodiment of the present invention.
Figure 26:
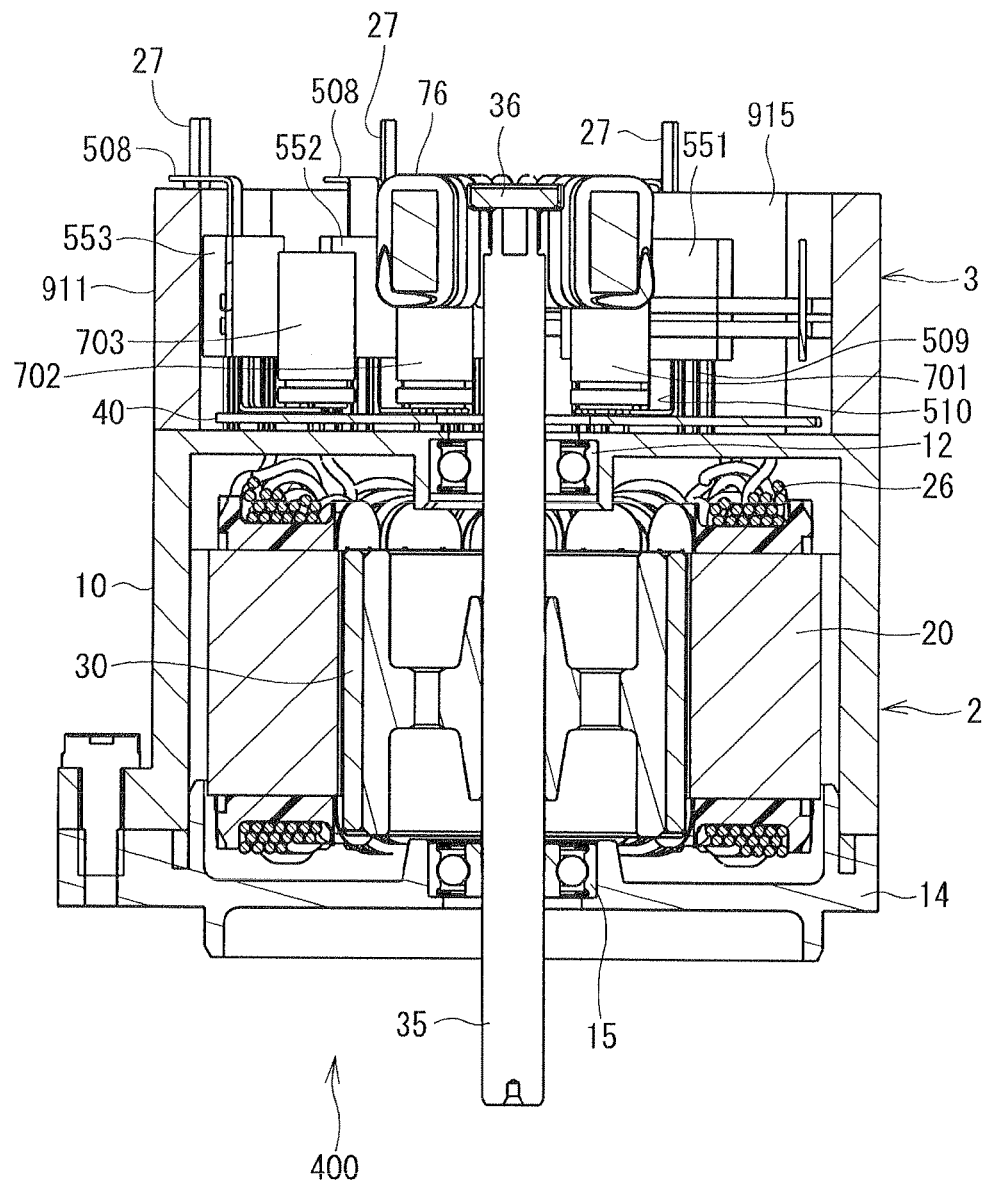
FIG. 26 is a cross-sectional view of the drive apparatus taken from line XXVI-XXVI in FIG. 23.
Figure 27:
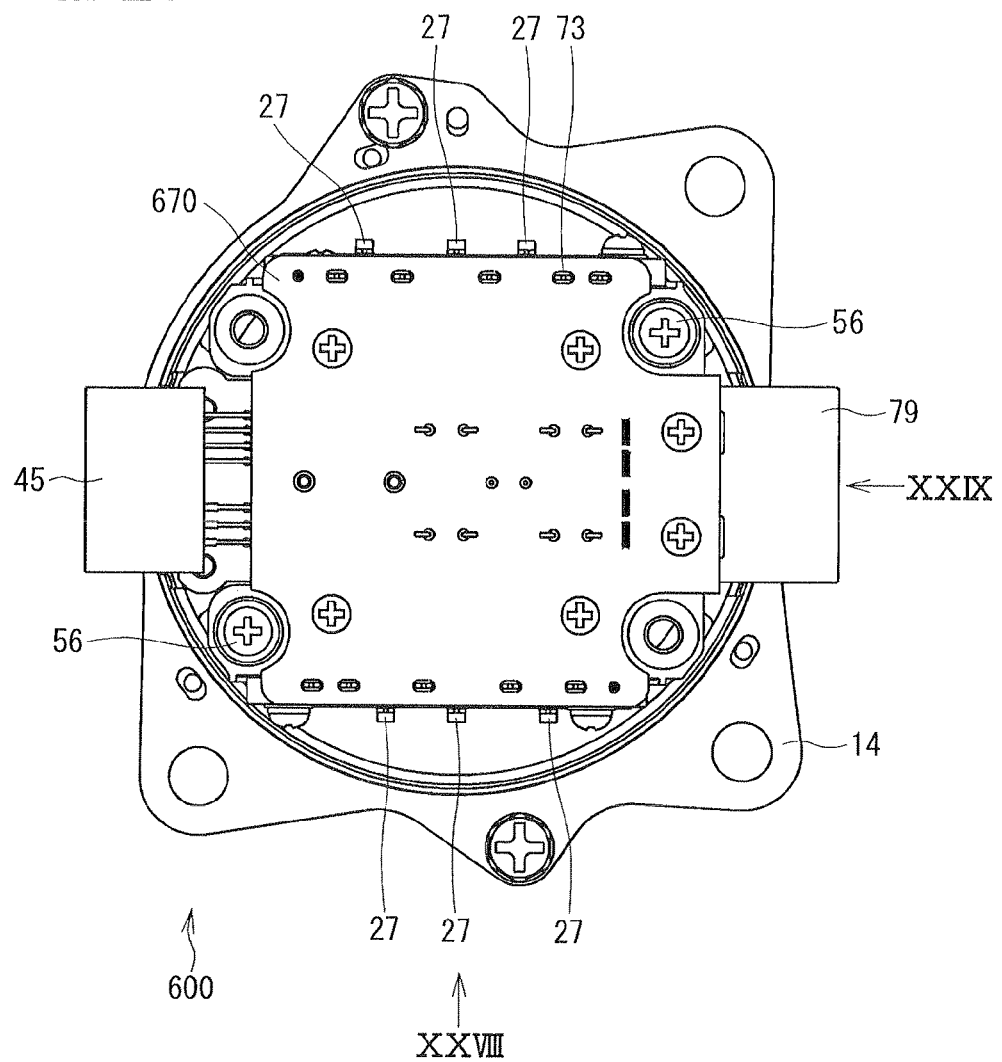
FIG. 27 is a plan view of a drive apparatus according to a fifth embodiment of the present invention.
Figure 28:
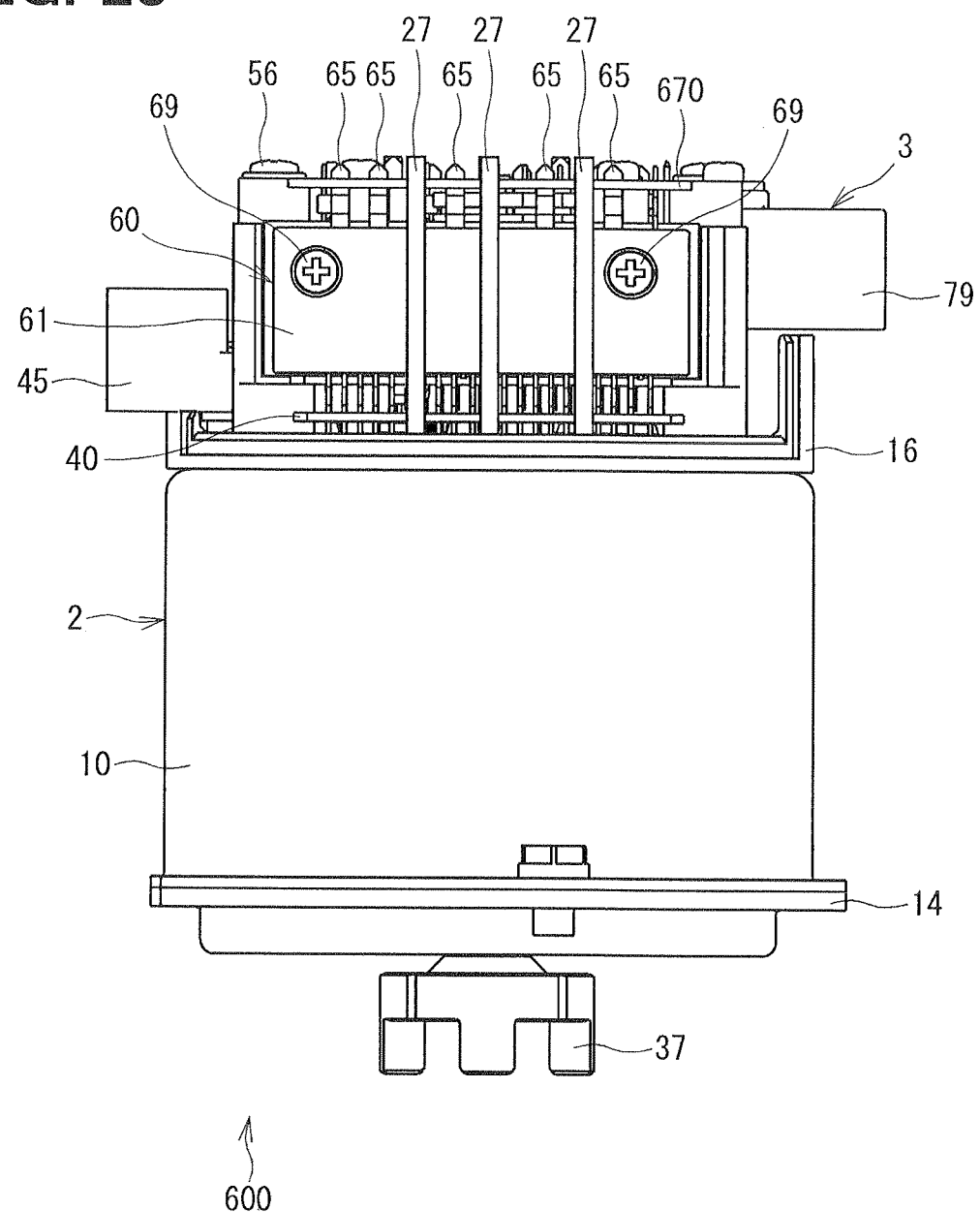
FIG. 28 is a side view of the drive apparatus viewed in a direction XXVIII in FIG. 27.
Figure 29:
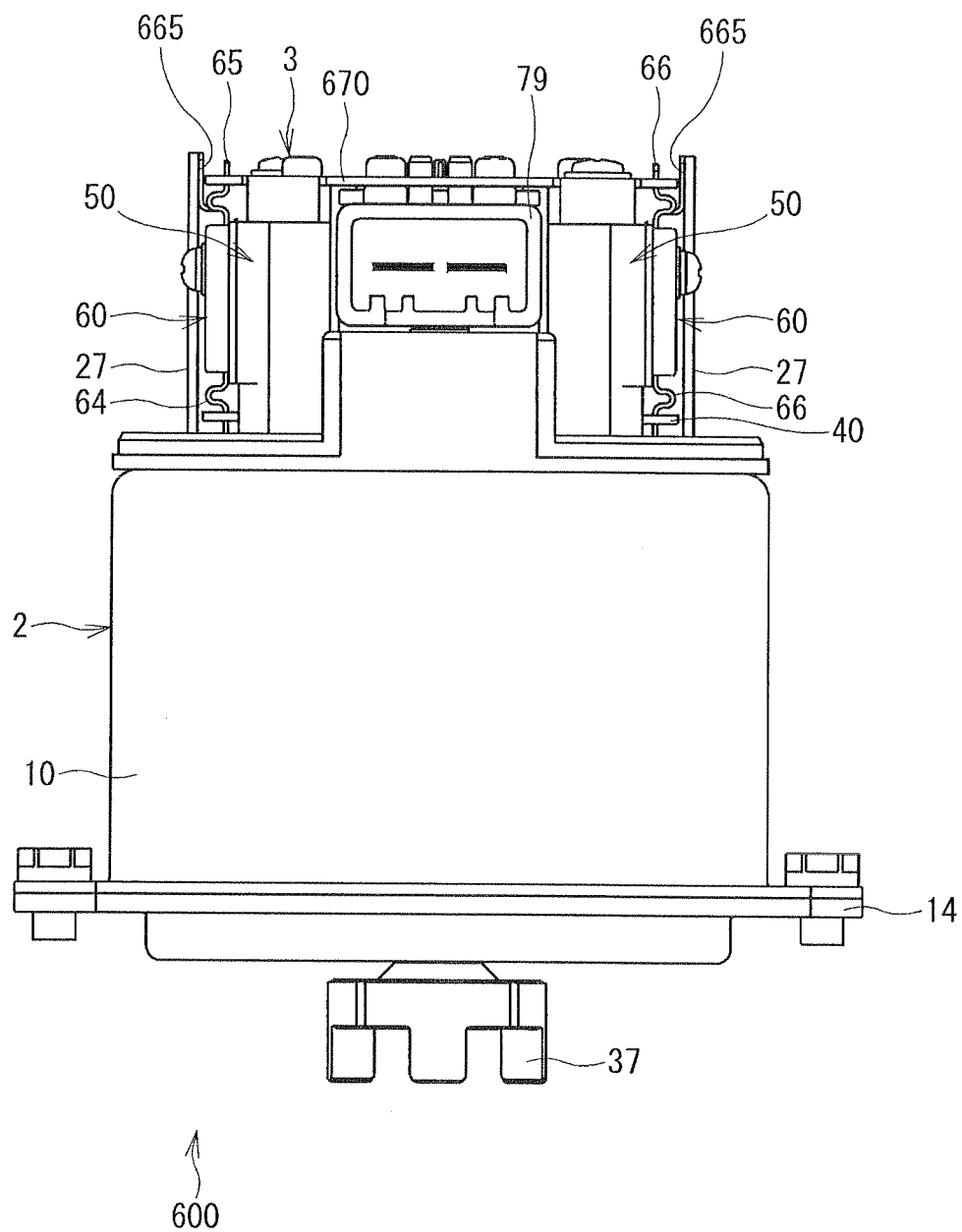
FIG. 29 is a side view of the drive apparatus viewed in a direction XXIX in FIG. 27.
Figure 30:
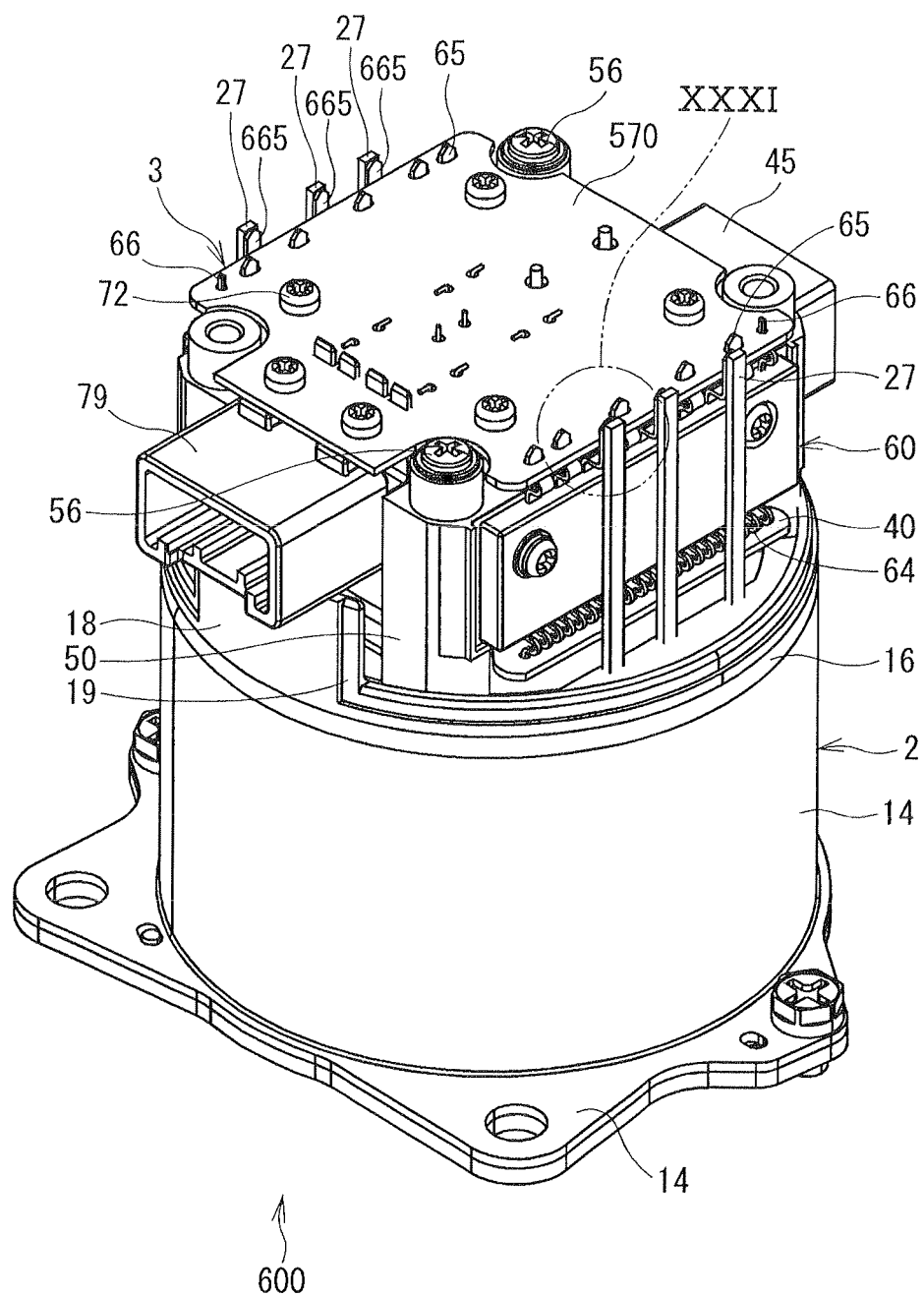
FIG. 30 is a perspective view of the drive apparatus according to the fifth embodiment of the present invention.

As shown in FIG. 23, the drive apparatus 400 has six semiconductor modules 551, 552, 553, 554, 555 and 556. To distinguish the semiconductor modules 551 to 556 from each other, the semiconductor modules 551 to 556 are referred to U1 semiconductor module 551, V1 semiconductor module 552, W1 semiconductor module 553, U2 semiconductor module 554, V2 semiconductor module 555 and W2 semiconductor module 556 using the symbols shown in FIG. 23.

Three semiconductor modules, the U1 semiconductor module 551 to the W1 semiconductor module 553 are connected with the other three semiconductor modules, the U2 semiconductor module 554 to the W2 semiconductor module 556, by the bus bar 507 to form the module unit. The bus bar 507 provides a connection part and the power supply line.

The semiconductor modules 551 to 556 are fitted to a heat sink 911, which is formed in a direction from the end surface wall 13 of the motor case 10 to an extending direction of the axial line of the shaft 35.

As shown in FIG. 23, the heat sink 911 is formed in a hollow cylinder shape viewed in a cross-sectional direction perpendicular to an axial direction of the heat sink 911. The space in the heat sink 911 is formed to polygonal column shape. The heat sink 911 has side wall 912 on the periphery of the axial line of the shaft 35. In this case, the outside surface of the heat sink 911 forms a part of the drive apparatus 400 frame (See FIGS. 24 and 25). Further, the side wall 912 of the heat sink 911 has six inside wall surfaces 915 on a circumferential direction facing radially inside of the heat sink 911.

Each of the semiconductor modules 551 to 556 is arranged on each of the inside wall surfaces 915, which face radially inside of the heat sink 911. The semiconductor modules 551 to 556 are arranged in such a manner that heat radiation surfaces are in contact with the inside wall surfaces 915. The inside wall surfaces 915 are formed of plane surfaces, accordingly the heat radiation surfaces of the semiconductor modules are formed of plane surfaces.

Since the semiconductor modules 551 to 556 are arranged on the inside wall surfaces 915 of the heat sink 911, a normal line of a semiconductor chip surface is perpendicular to the axial line of the shaft 35.

The control circuit substrate 40 is arranged nearer to the motor case 10 than the semiconductor modules 551 to 556. With this arrangement, in the semiconductor modules 551 to 556, six control terminals 509 and two capacitor terminals 510 are formed at end portions on the motor case 10 side (see FIG. 26). Further, in the semiconductor modules 551 to 556, winding wire terminals 508 are formed at end portions on the opposite side of the motor case 10. Thus, the motor leads 27 from the winding wires 26 go through the inner space of the side wall 912 of the heat sink 911 and go out at the end portion of the heat sink 911. The winding wire terminals 508 of the semiconductor modules 551 to 556 are directly connected to the motor leads 27. Thus the motor leads 27 and the semiconductor modules 551 to 556 are electrically connected. The connection spots between the wire terminals 508 and the motor leads 27 are formed at positions, which are the opposite side of the motor case 10 relative to mold parts of the semiconductor modules 551 to 556 in the axial direction of the motor case 10.

As shown in FIG. 23, six capacitors 701, 702, 703, 704, 705 and 706 are formed at an opposite side of the heat sink 911 relative to the semiconductor modules 551 to 556.

Each of the capacitors 701 to 706 is formed close to each of the semiconductor modules 551 to 556. The capacitors 701 to 706 have cylinder shape. The capacitors 701 to 706 are arranged in such a manner that, an axial line of each of the capacitors is parallel to the axial line of the shaft 35. Further, since the capacitor terminals 510 of the semiconductor modules 551 to 556 are bent radially inward, terminals of the capacitors 701 to 706 are connected directly to the bent capacitor terminals 510.

The choke coil 76 is arranged such that the shaft 35 is penetrated in the choke coil 76. The choke coil 76 is formed by winding coils on a ring-shaped iron core.

The semiconductor modules are arranged longitudinally to the end surface wall 13, which is formed in the axial direction of the motor case 10. That is, each of the semiconductor modules 551 to 556 is formed in the rising direction from the end surface wall 13. The motor case 10, the control circuit substrate 40, the heat sink 911, the semiconductor modules 551 to 556 and the winding wire terminals 508 are arranged in this order in the axial direction of the motor case 10. The motor leads 27 are connected with the semiconductor modules 551 to 556 at positions, which are the opposite side of the motor case 10 relative to mold parts of the semiconductor modules 551 to 556 in the axial direction of the motor case 10. Thus, the drive apparatus according to the present embodiment provides advantages similar to the above-described advantages (1), (2), (4), (5) and (6).

Further, the winding wire terminals 508 are formed on the semiconductor modules 551 to 556 to directly connect with the motor leads 27. Thus, power circuit substrate can be eliminated, and the semiconductor modules 551 to 556 can be connected to the motor leads 27 by a more simple structure. The number of circuit components can also be reduced. Since, the motor leads 27 are directly connected with the winding wire terminals 508, an impedance of the wiring can be reduced. Since the motor leads 27 are arranged radially outside of the power module 60, the motor leads 27 and the power module 60 are connected at a position, which is an end portion of the entirety of the drive apparatus 1 in the axial direction and is a region located outside in the radial direction of the drive apparatus 1. Thus, work efficiency can be increased.

Further, the shaft 35, the semiconductor modules 551 to 556, the motor leads 27 and the heat sink 911 are arranged in this order in the radial direction of the apparatus from the inner side to the outer side. With this arrangement, the inner space of the apparatus can be used effectively and the size of the entirety of the apparatus can be reduced.

The semiconductor modules 551 to 556 function as the power module. The winding wire terminals 508, which connect the semiconductor modules 551 to 556 and the motor leads 27, function as the power wiring part. The winding wire terminals 508, the control terminals 509 and the capacitor terminals 510 function as the terminal part. The inside wall surface 915 functions as the heat receiving surface.

(Fifth Embodiment)

A drive apparatus 600 according to a fifth embodiment is different from the first embodiment in that the motor leads 27 are connected to the power module 60 directly without the power circuit substrate 70 as shown in FIGS. 27 to 31

A power circuit substrate 670 is shaped smaller in size than the power circuit substrate 70 in the first embodiment. The motor leads 27 are formed radially outside of the power circuit substrate 670.

Figure 31:
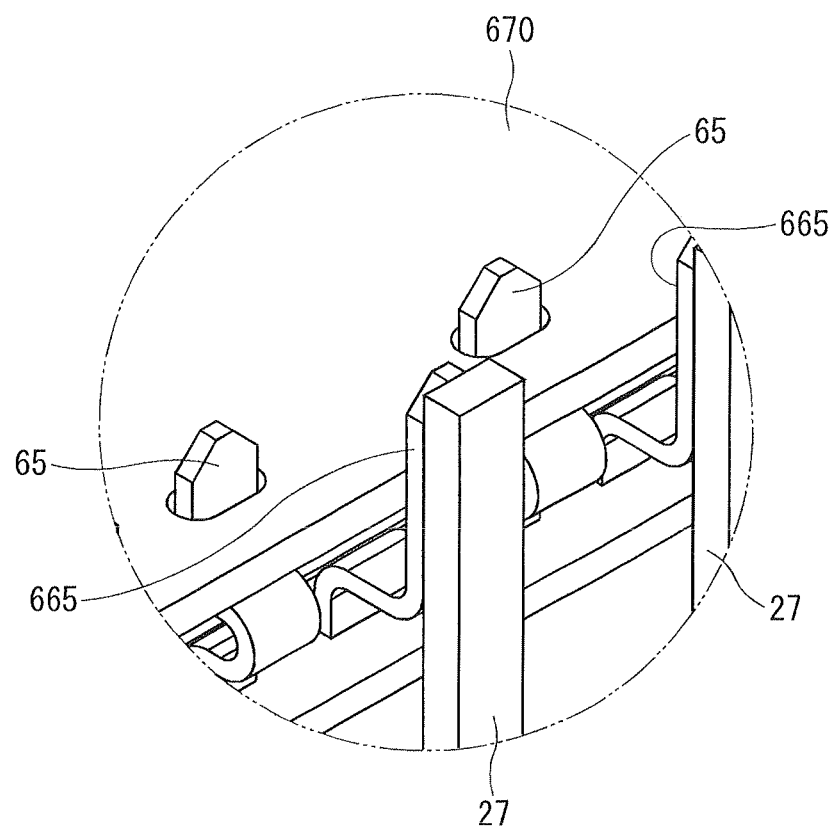
FIG. 31 is an enlarged view of a part of the drive apparatus shown by symbol XXXI in FIG. 30.

As shown in FIG. 31, in the power terminals 65, terminals 665 for connecting with the winding wires are bent to outward in the radial direction of the motor 2 at a position, which is on the motor 2 side relative to the power circuit substrate 670 in the axial direction of the motor 2. Then, the terminals 665 are bent to the opposite side of the motor case 10 along the motor leads 27 at an outer position than the power circuit substrate 670 in the axial direction of the motor 2. The motor leads 27 and the terminals 665 for connecting with the winding wires are connected directly by welding and the like.

Thus, the drive apparatus according to the present embodiment provides advantages similar to the above-described advantages (1) to (7) and (9).

Since the motor leads 27 and the terminals 665 for connecting with the winding wires are connected directly, an impedance of the wiring can be reduced. Since the motor leads 27 are formed at an outer position than the power module 60 in the axial direction of the motor 2, the motor leads 27 and the power module 60 are connected at a position, which is an end portion of the entirety of the drive apparatus 1 in the axial direction and is a region located outside in the radial direction of the drive apparatus 1. Thus, work efficiency can be increased.

(OTHER EMBODIMENTS)

According to the foregoing embodiments, the heat receiving surface of the heat sink is arranged generally perpendicular to the end surface wall formed in the axial direction of the motor case. The power module is arranged along the heat receiving surface. Thus, the power module is generally perpendicular to the end surface wall formed in the axial direction of the motor case. Alternatively, the power module may be arranged obliquely to the end surface of the motor case. Specifically, the power module may be arranged longitudinally on the end surface of the motor case in such a manner that an angle $\theta_1$ between the end surface of the motor case in the axial direction and the power module is larger than 0 degree and equal to or less than 90 degrees. In a case where the power module is arranged parallel to the end surface of the motor case in the axial direction, the angle $\theta_1$, which is between the end surface of the motor case in the axial direction and the wider surface of the power module, is defined as 0 degree. In a case where the power module is arranged perpendicular to the end surface of the motor case in the axial direction, the angle $\theta_1$, which is between the end surface of the motor case in the axial direction and the power module, is defined as 90 degrees. That is, an angle $\theta_2$ between the end surface of the motor case in the axial direction and the heat receiving surface of the heat sink is larger than 0 degree and equal to or less than 90 degrees, and the power module is arranged along the heat receiving surface so that the power module is arranged in the rising direction from the end surface wall formed in the axial direction of the motor case. In this case, the power module is arranged longitudinally to the end surface wall formed in the axial direction of the motor case. By the above-described arrangement, the size in the radial direction of the apparatus can be reduced compared with a case, in which the power module is arranged parallel to the end surface wall formed in the axial direction of the motor case.

According to the first embodiment to the third embodiment and the fifth embodiment, heat radiation blocks of the heat sink are connected integrally by the connection part. The heat radiation blocks may be formed as separate blocks, not connected by the connection part.

The heat radiation blocks are preferably provided in correspondence to the number of the systems of the inverter circuits. Alternatively, the number of the heat radiation blocks may be different from the number of the systems of the inverter circuits. For example, as described in the third embodiment, the power module, which forms one system of the inverter circuit, may be formed on two separate heat radiation blocks. For example, as described in the fourth embodiment, the power module, which forms two systems of the inverter circuit, may be formed on one heat radiation block.

According to the foregoing embodiments, two systems of the inverter circuit or one system of the inverter circuit are described as examples. The inverter circuit may be formed in three systems or more.

According to the foregoing embodiments, the electronic control unit are located at a position opposite to a gear box of the motor. In the other embodiments, alternatively, the electronic control unit may be located between the motor and the gear box. In this case, the shaft extends from the motor to the gear box in a manner to pass through the heat sinks formed to face each other, the control circuit substrate and the power circuit substrate.

According to the foregoing embodiments, MOSs are used as switching elements. Alternatively, switching elements may use any electronic components, which perform switching operation, not limited to the MOSs.

According to the foregoing embodiments, the drive apparatus is described as an apparatus, which is applied to the EPS. Alternatively, the drive apparatus with the similar structure according to the present disclosure may be used in other industries.

The present invention is not limited to the foregoing embodiments and modification but may be implemented differently.

The invention claimed is:

1. A drive apparatus comprising:
 a motor having a motor case formed in a cylindrical shape to define an outer periphery, a stator located radially inside the motor case and wound with winding wires to provide a plurality of phases, a rotor located radially inside the stator and rotatable relative to the stator, and a shaft rotatable together with the rotor;

a heat sink having a heat receiving surface located in a rising direction from an end surface wall of the motor case formed in an axial direction of the motor case;

a power module having switching elements to switch over current supply to the winding wires, a mold part to mold the switching elements and terminals protruded from the mold part, the power module being arranged along the heat receiving surface of the heat sink;

a control wiring part having a control circuit that controls driving of the motor and electrically connected to the power module;

a power wiring part supplying a drive current to the winding wires and electrically connected to the power module; and motor leads taken out from the motor case and electrically connecting to the power module and the winding wires, wherein the motor case, the control wiring part, the heat sink and the power module, and the power wiring part are arranged in a recited order in the axial direction of the motor case, wherein the motor leads are connected to the power module at a position, which is opposite to the motor case relative to the mold part of the power module in the axial direction of the motor case, wherein the motor leads are formed at an outer side of the power module in a radial direction of the motor case to extend across the power module in a radial outside region of the power module;

wherein the heat receiving surface of the heat sink is perpendicular to the end surface wall of the motor case;

wherein the power module is mounted on the heat receiving surface of the heat sink; and wherein the terminals of the power module include control terminals and power terminals, the control terminals protruding in the axial direction of the motor case toward the control wiring part and the power terminals protruding in the axial direction of the motor case toward the power wiring part.

2. The drive apparatus according to claim 1, wherein:
the shaft, the heat sink and the power module are arranged in a recited order and outward in the radial direction of the motor case.

3. The drive apparatus according to claim 2, wherein:
the motor leads and the power module are connected through the power wiring part.

4. The drive apparatus according to claim 2, wherein:
the motor leads and the power module are connected directly without through the power wiring part.

5. The drive apparatus according to claim 2, wherein:
the heat sink has a plurality of column-shaped parts formed to be distanced from each other; and
the power module is provided for each of a plurality of drive systems and arranged on each of the column-shaped parts so that one drive system corresponds to one column-shaped part.

6. The drive apparatus according to claim 1, wherein:
the motor leads and the power module are connected through the power wiring part.

7. The drive apparatus according to claim 6, wherein:
the heat sink has a plurality of column-shaped parts formed to be distanced from each other; and
the power module is provided for each of a plurality of drive systems and arranged on each of the column-shaped parts so that one drive system corresponds to one column-shaped part.

8. The drive apparatus according to claim 1, wherein:
the motor leads and the power module are connected directly without through the power wiring part.

9. The drive apparatus according to claim 1, wherein:
the heat sink has a plurality of column-shaped parts formed to be distanced from each other; and
the power module is provided for each of a plurality of drive systems and arranged on each of the column-shaped parts so one power supply system corresponds to one column-shaped part.

10. The drive apparatus according to claim 1, further comprising:
a magnet provided at one axial end of the shaft of the motor to face the control wiring part in the axial direction of the motor case; and
a position sensor part provided on the control wiring part to detect rotation of the magnet.

11. The drive apparatus according to claim 1, wherein the power module is located radially outside the heat sink.

12. The drive apparatus according to claim 1, wherein:
the control wiring part includes a control circuit substrate, on which electronic components of the control circuit are mounted; and
the power wiring part includes a power circuit substrate, on which electronic components of a power circuit are mounted.

13. A drive apparatus comprising:
a motor having a motor case formed in a cylindrical shape to define an outer periphery, a stator located radially inside the motor case and wound with winding wires to provide a plurality of phases, a rotor located radially inside the stator and rotatable relative to the stator, and a shaft rotatable together with the rotor;

a heat sink having a heat receiving surface located in a rising direction from an end surface wall of the motor case formed in an axial direction of the motor case, wherein the heat receiving surface is perpendicular to the end wall surface of the motor case, and wherein the heat sink is fixed to the end surface wall of the motor case in a heat transfer relationship therebetween;

a power module having switching elements to switch over current supply to the winding wires, a mold part to mold the switching elements and terminals protruded from the mold part, the power module being arranged along the heat receiving surface of the heat sink;

a control wiring part having a control circuit that controls driving of the motor and electrically connected to the power module;

a power wiring part supplying a drive current to the winding wires and electrically connected to the power module; and motor leads taken out from the motor case and electrically connecting to the power module and the winding wires, wherein the motor case, the control wiring part, the heat sink and the power module, and the power wiring part are arranged in a recited order in the axial direction of the motor case, and wherein the motor leads are connected to the power module at a position, which is opposite to the motor case relative to the mold part of the power module in the axial direction of the motor case, and wherein the motor leads are formed at an outer side of the power module in a radial direction of the motor case to extend across the power module in a radial outside region of the power module;

wherein the power module is mounted on the heat receiving surface of the heat sink;

wherein the terminals of the power module include control terminals and power terminals, the control terminals protruding in the axial direction of motor case toward the control wiring part and the power terminals protruding in the axial direction of the motor case toward the power wiring part.

* * * * *